(12) United States Patent
Miyauchi

(10) Patent No.: US 11,569,038 B2
(45) Date of Patent: Jan. 31, 2023

(54) MULTILAYER CERAMIC ELECTRONIC COMPONENT

(71) Applicant: Murata Manufacturing Co., Ltd., Nagaokakyo (JP)

(72) Inventor: Satoshi Miyauchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 106 days.

(21) Appl. No.: 17/062,660

(22) Filed: Oct. 5, 2020

(65) Prior Publication Data

US 2021/0125784 A1 Apr. 29, 2021

(30) Foreign Application Priority Data

Oct. 25, 2019 (JP) .............................. JP2019-194439

(51) Int. Cl.
*H01G 4/30* (2006.01)
*H01G 4/012* (2006.01)
*H01G 2/06* (2006.01)
*H01G 4/008* (2006.01)
*H01G 4/12* (2006.01)
*H01G 4/232* (2006.01)

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01); *H01G 4/232* (2013.01)

(58) Field of Classification Search
CPC ........ H01G 4/306; H01G 4/008; H01G 4/015; H01G 4/30; H01G 4/065; H01G 4/012; H01G 4/1218; H01G 4/232
See application file for complete search history.

(56) References Cited

U.S. PATENT DOCUMENTS

| 2005/0041367 A1 | 2/2005 | Yoshii et al. | |
| 2016/0211075 A1* | 7/2016 | Park | H01G 4/38 |
| 2017/0062789 A1* | 3/2017 | Sim | H01M 50/502 |
| 2018/0374640 A1* | 12/2018 | Akiyoshi | H01G 4/30 |
| 2020/0203076 A1* | 6/2020 | Ando | H01G 4/224 |
| 2020/0294719 A1* | 9/2020 | Masuda | H01G 4/224 |

FOREIGN PATENT DOCUMENTS

| GN | 1707709 A | 12/2005 |
| JP | S5387849 U | 7/1978 |
| JP | S6035532 U | 3/1985 |

(Continued)

OTHER PUBLICATIONS

Office Action in JP2019-194439, dated Jul. 26, 2022, 6 pages.
Office Action in Application No. JP2019194439, dated May 10, 2022, 5 pages.

*Primary Examiner* — Michael P McFadden
(74) *Attorney, Agent, or Firm* — Keating & Bennett, LLP

(57) ABSTRACT

A multilayer ceramic electronic component includes first and second multilayer ceramic electronic component bodies facing each other in a length direction that connects first and second end surfaces. A first metal terminal is connected to a first outer electrode. A second metal terminal is connected to a fourth outer electrode. An outer casing covers the first and second multilayer ceramic electronic component bodies, and at least a portion of each of the first and second metal terminals. A third metal terminal is exposed from the outer casing.

20 Claims, 7 Drawing Sheets

(56) References Cited

FOREIGN PATENT DOCUMENTS

| | | | |
|---|---|---|---|
| JP | H04293216 | A | 10/1992 |
| JP | 2001052951 | A | 2/2001 |
| JP | 2005-064377 | A | 3/2005 |
| JP | 2010-123585 | A | 6/2010 |
| JP | 2015-228435 | A | 12/2015 |
| JP | 2018-129445 | A | 8/2018 |
| JP | 2019009360 | A | 1/2019 |

* cited by examiner

MULTILAYER CERAMIC ELECTRONIC COMPONENT

CROSS REFERENCE TO RELATED APPLICATIONS

This application claims the benefit of priority to Japanese Patent Application No. 2019-194439 filed on Oct. 25, 2019. The entire contents of this application are hereby incorporated herein by reference.

BACKGROUND OF THE INVENTION

1. Field of the Invention

The present invention relates to a multilayer ceramic electronic component.

2. Description of the Related Art

In general, in the case where a multilayer ceramic capacitor included in a multilayer ceramic electronic component is mounted on a mounting substrate using solder, when a temperature changes, a wiring board and an electronic component body expand or contract based on their respective thermal expansion coefficients. The difference between these thermal expansion coefficients becomes a cause of stress, for example, that causes damage to an electronic component body, breakage of a joining portion, or the like.

Furthermore, in the case where the wiring board is more likely to bend like a thin glass epoxy substrate, similar stress may occur also when the wiring board bends. Furthermore, also when the wiring board itself receives force and bends and deforms, similar stress may occur. Application of such stress onto a multilayer ceramic capacitor may cause cracking in the multilayer ceramic capacitor.

In order to solve the above-described problems, Japanese Patent Laid-Open No. 2005-64377 discloses a method of attaching a metal terminal to a terminal electrode of a capacitor element, and soldering the metal terminal to a wiring board in the state where the capacitor element is floated above the wiring board.

According to the method disclosed in Japanese Patent Laid-Open No. 2005-64377, heat for soldering is transmitted through the metal terminal to an electronic component body. Thus, thermal shock can be less likely to be applied to the electronic component body. Furthermore, a temperature change causes even stress or deformation of the wiring board, which can be advantageously absorbed by elastic deformation of the metal terminal.

In recent years, the structure as described above (for example, as disclosed in Japanese Patent Laid-Open No. 2005-64377) has been increasingly demanded to have a higher breakdown voltage and a larger capacity.

In such a circumstance, a technique is disclosed for allowing a higher breakdown voltage and a larger capacity by connecting two or more multilayer ceramic capacitors in series in a multilayer ceramic electronic component equipped with a metal terminal, for example, as disclosed in Japanese Patent Laid-Open No. 2015-228435.

In a multilayer ceramic electronic component equipped with a metal terminal disclosed in each of Japanese Patent Laid-Open Nos. 2005-64377 and 2015-228435, when two or more multilayer ceramic capacitors are connected in series, the breakdown voltage between the metal terminals can be raised. However, due to a short distance between terminals of the outer electrodes of the respective multilayer ceramic capacitors, and a short distance between the outer electrode and the metal terminal, creeping discharge may cause a breakdown voltage reduction in a product. Thus, the multilayer ceramic electronic component equipped with a metal terminal needs an increased creepage distance between the terminals. Therefore, in some cases, the multilayer ceramic electronic component needs to be molded by a resin.

When the multilayer ceramic electronic component including two or more multilayer ceramic capacitors connected in series is molded by a resin, however, problems may occur in characteristics selection. For example, when characteristics are selected by two metal terminals protruding from a resin mold formed in the structure having two or more multilayer ceramic capacitors connected in series, a total sum of the IR values of the multilayer ceramic capacitors is used. Thus, even when the multilayer ceramic capacitors connected in series and incorporated in the resin mold product include a multilayer ceramic capacitor having an IR value below the lower limit of the standard IR value, but when the IR value of another multilayer ceramic capacitor reaches the standard IR value in terms of the total sum value, the multilayer ceramic capacitor having an IR value below the lower limit of the standard IR value cannot be removed by characteristics selection. This may consequently lower the reliability.

SUMMARY OF THE INVENTION

Preferred embodiments of the present invention provide multilayer ceramic electronic components that each enable consideration of the quality of each of electronic component bodies even when these electronic component bodies are molded in an outer casing.

A multilayer ceramic electronic component according to a preferred embodiment of the present invention includes a first multilayer ceramic electronic component body including a first multilayer body that includes a plurality of stacked ceramic layers and a plurality of stacked inner electrode layers, the first multilayer body including a first main surface and a second main surface that face each other in a height direction, a first side surface and a second side surface that face each other in a width direction orthogonal or substantially orthogonal to the height direction, and a first end surface and a second end surface that face each other in a length direction orthogonal or substantially orthogonal to the height direction and the width direction, a first outer electrode disposed on the first end surface of the first multilayer body, and a second outer electrode disposed on the second end surface of the first multilayer body; and a second multilayer ceramic electronic component body including a second multilayer body that includes a plurality of stacked ceramic layers and a plurality of stacked inner electrode layers, the second multilayer body including a first main surface and a second main surface that face each other in the height direction, a first side surface and a second side surface that face each other in the width direction orthogonal or substantially orthogonal to the height direction, and a first end surface and a second end surface that face each other in the length direction orthogonal or substantially orthogonal to the height direction and the width direction, a third outer electrode disposed on the first end surface of the second multilayer body, and a fourth outer electrode disposed on the second end surface of the second multilayer body. The first multilayer ceramic electronic component body and the second multilayer ceramic electronic component body face each other in the length direction connecting the first end surface and the second end surface. A first metal terminal is connected to the first outer electrode, and a second metal terminal is connected to the fourth outer electrode. An outer casing covers the first multilayer ceramic electronic component body, the second multilayer ceramic electronic component body, at least a portion of the first metal terminal, and at least a portion of the second metal terminal. A third metal terminal is exposed from the outer casing. The third metal terminal extends over the second outer electrode of the first multilayer ceramic electronic component body and the third outer electrode of the second multilayer ceramic electronic component body.

A multilayer ceramic electronic component according to a preferred embodiment of the present invention includes the third metal terminal exposed from the outer casing. Thus, even when the outer casing covers the multilayer ceramic electronic component bodies that are connected in series, the insulation resistance values (IR values) of the respective multilayer ceramic electronic component bodies is able to be accurately measured by using the third metal terminal.

In other words, when the insulation resistance value (IR value) of the first multilayer ceramic electronic component body is measured, measurement terminals are connected to the first metal terminal and the third metal terminal to measure the insulation resistance value (IR value) of the first multilayer ceramic electronic component body. When the insulation resistance value (IR value) of the second multilayer ceramic electronic component body is measured, measurement terminals are connected to the second metal terminal and the third metal terminal to measure the insulation resistance value (IR value) of the second multilayer ceramic electronic component body.

With this configuration, in the case where the plurality of multilayer ceramic electronic component bodies connected in series and covered by the outer casing include a multilayer ceramic electronic component body having an insulation resistance value (IR value) less than the lower limit of the standard IR value, the multilayer ceramic electronic component including such a multilayer ceramic electronic component body is able to be removed reliably by characteristics selection.

In addition, in the case where the plurality of multilayer ceramic electronic component bodies connected in series and covered by the outer casing include a multilayer ceramic electronic component body having an insulation resistance value (IR value) less than the lower limit of the standard IR value, the lifetime of the multilayer ceramic electronic component is reduced.

Thus, according to preferred embodiments of the present invention, even in the case where the product quality is excellent in terms of the total sum of the insulation resistance values (IR values) of the plurality of multilayer ceramic electronic component bodies connected in series and covered by the outer casing, a multilayer ceramic electronic component including even a single multilayer ceramic electronic component body having an insulation resistance value (IR value) less than the lower limit of the standard IR value among the multilayer ceramic electronic component bodies is able to be selected as a defective product. Therefore, multilayer ceramic electronic components with excellent quality are able to be provided that each include multilayer ceramic electronic component bodies each having an insulation resistance value (IR value) that reliably exceeds the standard IR value.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the accompanying drawings.

1. MULTILAYER CERAMIC ELECTRONIC COMPONENT

Figure 1:
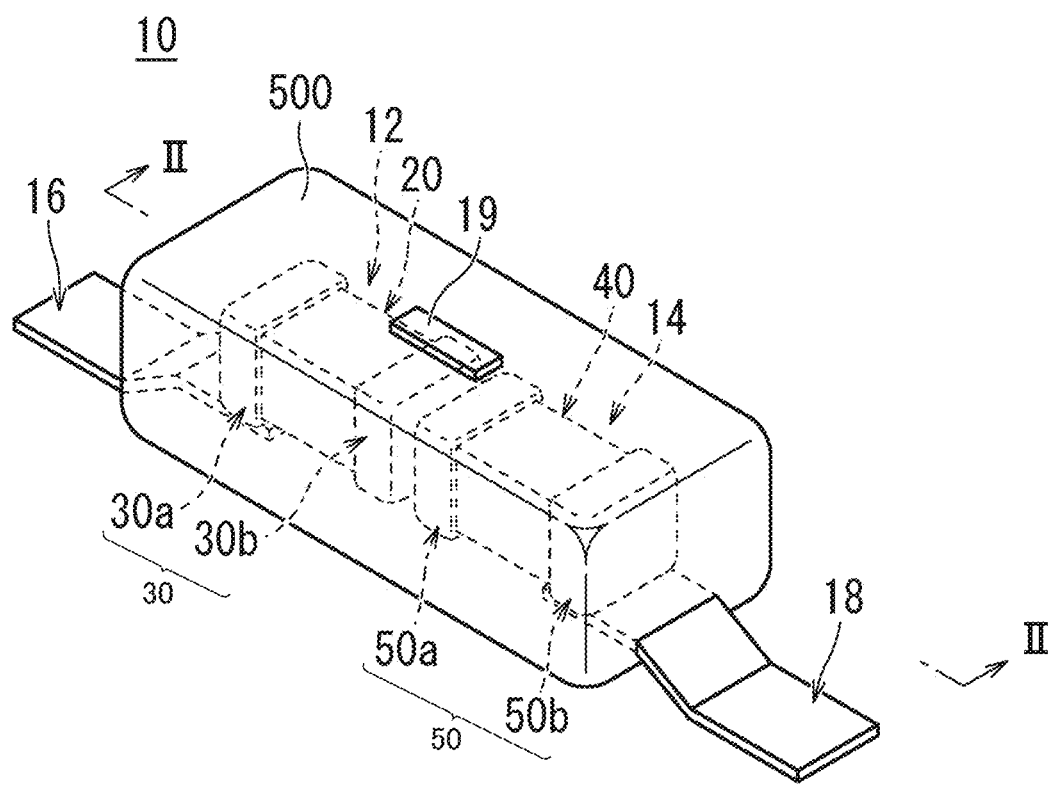
FIG. 1 is an external perspective view showing an example of a multilayer ceramic electronic component according to a preferred embodiment of the present invention.
Figure 2:
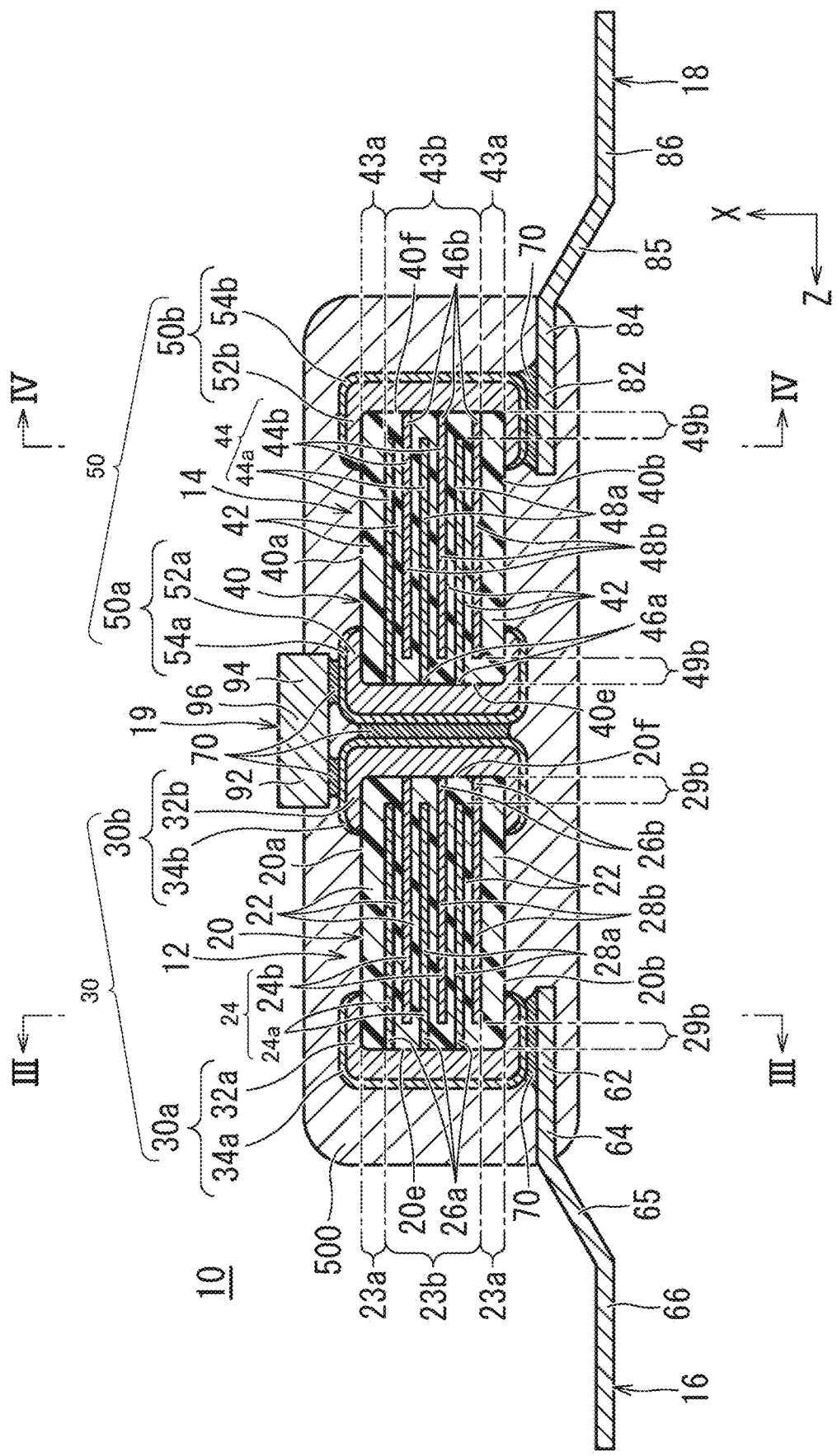
FIG. 2 is a cross-sectional view taken along a line II-II in FIG. 1.
Figure 3:
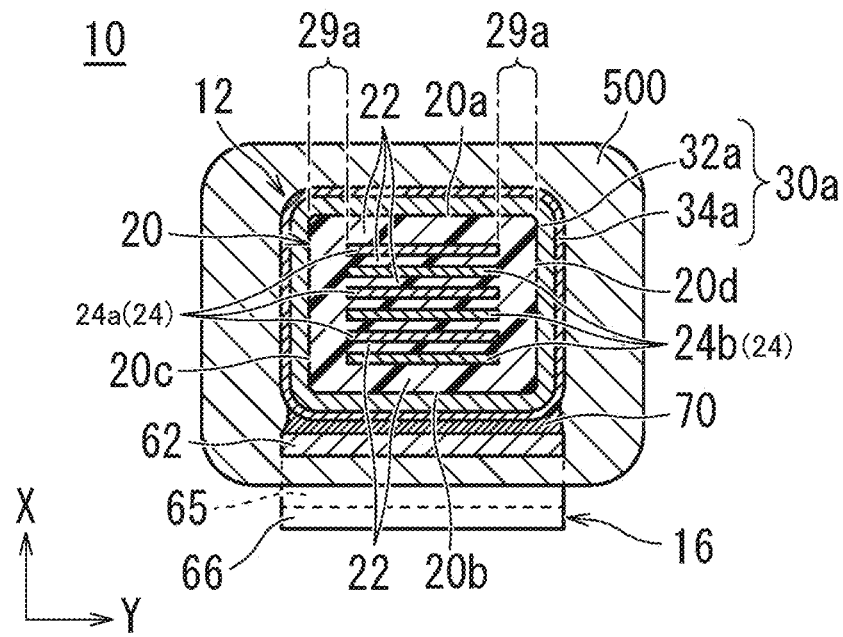
FIG. 3 is a cross-sectional view taken along a line III-III in FIG. 2.
Figure 4:
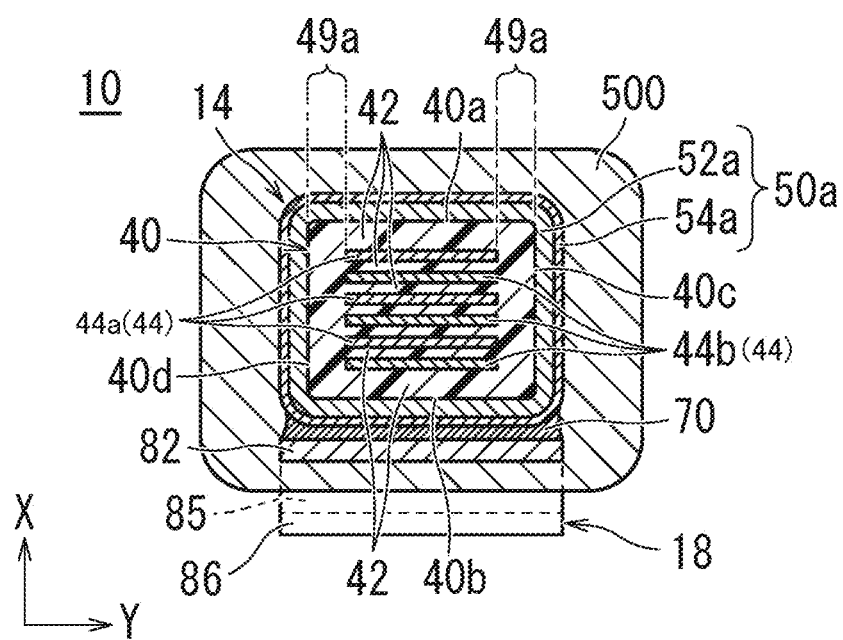
FIG. 4 is a cross-sectional view taken along a line IV-IV in FIG. 2.

A multilayer ceramic electronic component according to a preferred embodiment of the present invention will be hereinafter described. FIG. 1 is an external perspective view showing an example of a multilayer ceramic electronic component according to a preferred embodiment of the present invention. FIG. 2 is a cross-sectional view taken along a line II-II in FIG. 1. FIG. 3 is a cross-sectional view taken along a line in FIG. 2. FIG. 4 is a cross-sectional view taken along a line IV-IV in FIG. 2.

As shown in FIGS. 1 to 4, a multilayer ceramic electronic component 10 includes a multilayer ceramic electronic component body 12, a second multilayer ceramic electronic component body 14, a first metal terminal 16, a second metal terminal 18, a third metal terminal 19, and an outer casing 500.

The dimension of multilayer ceramic electronic component 10 in a length direction Z is defined as an L dimension. The L dimension is preferably about 1.0 mm or more and about 100.0 mm or less, for example, without particular limitation. The dimension of multilayer ceramic electronic component 10 in a height direction X is defined as a T dimension. The T dimension is preferably about 0.5 mm or more and about 20.0 mm or less, for example, without particular limitation. The dimension of multilayer ceramic electronic component 10 in a width direction Y is defined as a W dimension. The W dimension is preferably about 0.5 mm or more and about 50.0 mm or less, for example, without particular limitation.

Multilayer ceramic electronic component 10 in the present preferred embodiment of the present invention includes a first multilayer ceramic electronic component body 12 and a second multilayer ceramic electronic component body 14, as shown in FIGS. 1 to 4. Three or more multilayer ceramic electronic component bodies may be provided.

First multilayer ceramic electronic component body 12 and second multilayer ceramic electronic component body 14 are disposed to face each other in the length direction that connects a first end surface 20e of a first multilayer body 20 and a fourth end surface 40f of a second multilayer body 40.

First multilayer ceramic electronic component body 12 and second multilayer ceramic electronic component body 14 are connected through a second outer electrode 30b and a third outer electrode 50a, which will be described later. A joining material 70 is used for connection. Joining material 70 may preferably be made using a material such as solder, an electrically conductive adhesive, a transient liquid-phase sintering (TLP) material, for example.

First multilayer ceramic electronic component body 12 includes first multilayer body 20 having a rectangular or substantially rectangular parallelepiped shape, a first outer electrode 30a, and a second outer electrode 30b. Second multilayer ceramic electronic component body 14 includes a second multilayer body 40 having a rectangular or substantially rectangular parallelepiped shape, a third outer electrode 50a, and a fourth outer electrode 50b.

In a lower portion of multilayer ceramic electronic component 10 in height direction X, first metal terminal 16 is connected to first outer electrode 30a and second metal terminal 18 is connected to fourth outer electrode 50b.

In the following, the components of multilayer ceramic electronic component 10 will be described in further detail.
(A) First Multilayer Ceramic Electronic Component Body
(i) First Multilayer Body As shown in FIGS. 1 to 4, first multilayer body 20 includes a plurality of stacked ceramic layers 22 and a plurality of stacked inner electrode layers 24. Furthermore, first multilayer body 20 includes a first main surface 20a and a second main surface 20b that face each other in a stacking direction, a first side surface 20c and a second side surface 20d that face each other in a width direction orthogonal or substantially orthogonal to the stacking direction, and a first end surface 20e and a second end surface 20f that face each other in a length direction orthogonal or substantially orthogonal to the stacking direction and the width direction.

First multilayer body 20 includes a corner portion and a ridgeline portion, each of which is preferably rounded. In this case, the corner portion corresponds to a portion at which adjoining three planes of the multilayer body cross each other. The ridgeline portion corresponds to a portion at which adjoining two planes of the multilayer body cross each other. Furthermore, first main surface 20a, second main surface 20b, first side surface 20c, second side surface 20d, first end surface 20e, and second end surface 20f each may be partially or entirely provided with projections and recesses, and the like.

First multilayer body 20 includes an outer layer portion 23a including a plurality of ceramic layers 22, an inner layer portion 23b including a single ceramic layer 22 or a plurality of ceramic layers 22 and a plurality of inner electrode layers 24 disposed thereon. Outer layer portion 23a is located on each of the first main surface 20a side and the second main surface 20b side of first multilayer body 20, and includes a plurality of ceramic layers 22 located between first main surface 20a and an inner electrode layer 24 that is closest to first main surface 20a; and a plurality of ceramic layers 22 located between second main surface 20b and an inner electrode layer 24 that is closest to second main surface 20b. Inner layer portion 23b is sandwiched between both outer layer portions 23a. In other words, inner layer portion 23b includes inner electrode layer 24 while outer layer portion 23a does not include inner electrode layer 24.

When first multilayer body 20 functions as a capacitor, ceramic layer 22 may preferably be made of a dielectric ceramic containing components such as $BaTiO_3$, $CaTiO_3$, $SrTiO_3$, or $CaZrO_3$, for example. When the above-described dielectric material is included as a main component, a material including an additional component (such as an Mn compound, an Fe compound, a Cr compound, a Co compound, or an Ni compound, for example) that is less in content than the main component may be used in accordance with the characteristics desired for first multilayer body 20.

When a piezoelectric ceramic is used for first multilayer body 20, multilayer ceramic electronic component body 12 defines and functions as a ceramic piezoelectric element. A specific example of the piezoelectric ceramic material may preferably be a lead zirconate titanate (PZT)-based ceramic material or the like, for example.

Furthermore, when a semiconductor ceramic is used for first multilayer body 20, multilayer ceramic electronic component body 12 define and functions as a thermistor element. A specific example of the semiconductor ceramic material may preferably be a spinel-based ceramic material or the like, for example.

Furthermore, when magnetic ceramic is used for first multilayer body 20, multilayer ceramic electronic component body 12 defines and functions as an inductor element. When multilayer ceramic electronic component body 12 defines and functions as an inductor element, inner electrode layer 24 is a coil-shaped conductor. A specific example of the magnetic ceramic material may preferably be a ferrite ceramic material or the like, for example.

The thickness of calcined ceramic layer 22 is preferably about 0.5 μm or more and about 10 μm or less, for example.

First multilayer body 20 includes, as a plurality of inner electrode layers 24, a plurality of first inner electrode layers 24a and a plurality of second inner electrode layers 24b each of which has a rectangular or substantially rectangular shape, for example. The plurality of first inner electrode layers 24a and the plurality of second inner electrode layers 24b are buried so as to be alternately arranged at regular intervals in the stacking direction of first multilayer body 20. In this case, each of inner electrode layers 24 may be disposed not on a single ceramic layer 22 but on a plurality of stacked ceramic layers 22.

Each first inner electrode layer 24a and each second inner electrode layer 24b may be disposed so as to be in parallel or substantially in parallel with a mounting surface or may be disposed to be vertical (perpendicular or substantially perpendicular) to the mounting surface.

First inner electrode layer 24a includes a first facing electrode portion 28a facing second inner electrode layer 24b, and a first extending electrode portion 26a located on one end side of first inner electrode layer 24a and extending from first facing electrode portion 28a to first end surface 20e of first multilayer body 20. First extending electrode portion 26a includes an end portion extending to first end surface 20e and exposed from first end surface 20e.

Second inner electrode layer 24b includes a second facing electrode portion 28b that faces first inner electrode layer 24a, and a second extending electrode portion 26b located on one end side of second inner electrode layer 24b and extending from second facing electrode portion 28b to second end surface 20f of first multilayer body 20. Second extending electrode portion 26b includes an end portion extending to second end surface 20f and exposed from second end surface 20f.

It is preferable that first facing electrode portion 28a of first inner electrode layer 24a and second facing electrode portion 28b of first inner electrode layer 24b each have a rectangular or substantially rectangular shape without particular limitation. Also, the corner portion may be rounded or may has a slope shape (e.g., a taper shape).

It is preferable that first extending electrode portion 26a of first inner electrode layer 24a and second extending electrode portion 26b of second inner electrode layer 24b each have a rectangular or substantially rectangular shape without particular limitation. Also, the corner portion may be rounded or may has a slope shape (e.g., a taper shape).

First facing electrode portion 28a of first inner electrode layer 24a and first extending electrode portion 26a of first inner electrode layer 24a may have the same or substantially the same width, or one of the widths may be narrower than the other. Similarly, second facing electrode portion 28b of second inner electrode layer 24b and second extending electrode portion 26b of second inner electrode layer 24b may have the same or substantially the same width, or one of the widths may be narrower than the other.

First inner electrode layer 24a and second inner electrode layer 24b may extend to only first end surface 20e and second end surface 20f, or may has a T-shape so as to extend to not only first end surface 20e and second end surface 20f but also to first side surface 20c and second side surface 20d.

First multilayer body 20 includes a side portion (W gap) 29a that is provided between first side surface 20c and one ends of first facing electrode portion 28a and second facing electrode portion 28b in the width direction, and between second side surface 20d and the other ends of first facing electrode portion 28a and second facing electrode portion 28b in the width direction. Furthermore, first multilayer body 20 includes an end portion (L gap) 29b that is provided between second end surface 20f and the end portion of first inner electrode layer 24a that is opposite to first extending electrode portion 26a, and between first end surface 20e and the end portion of second inner electrode layer 24b that is opposite to second extending electrode portion 26b.

Inner electrode layer 24 preferably includes, for example, metals such as Ni, Cu, Ag, Pd, or Au, or an alloy such as an Ag—Pd alloy containing one of these metals. Inner electrode layer 24 may further include dielectric particles of the same composition base as that of ceramic included in ceramic layer 22.

The thickness of inner electrode layer 24 is preferably about 0.2 μm or more and about 3.0 μm or less, for example.

(ii) First Outer Electrode and Second Outer Electrode

First outer electrode 30a is disposed on the first end surface 20e side of first multilayer body 20, and second outer electrode 30b is disposed on the second end surface 20f side of first multilayer body 20.

First outer electrode 30a is disposed on the surface of first end surface 20e of first multilayer body 20 and extends from first end surface 20e to cover a portion of each of first main surface 20a, second main surface 20b, first side surface 20c, and second side surface 20d. In this case, first outer electrode 30a is electrically connected to first extending electrode 26a of first inner electrode layer 24a. However, first outer electrode 30a may be disposed only on the surface of first end surface 20e of first multilayer body 20. It is preferable that first outer electrode 30a is disposed only on at least a portion of second main surface 20b that is to be located on the side of first multilayer body 20 that is close to the mounting surface. This allows first metal terminal 16 to be connected on the side of first multilayer body 20 that is close to the mounting surface, thus enabling a lower profile.

Second outer electrode 30b is disposed on the surface of second end surface 20f of first multilayer body 20, and extends from second end surface 20f to cover a portion of each of first main surface 20a, second main surface 20b, first side surface 20c, and second side surface 20d. In this case, second outer electrode 30b is electrically connected to second extending electrode 26b of second inner electrode layer 24b. However, second outer electrode 30b may be disposed only on the surface of second end surface 20f of first multilayer body 20.

On the inside of first multilayer body 20, first facing electrode portion 28a of first inner electrode layer 24a and second facing electrode portion 28b of second inner electrode layer 24b face each other with ceramic layer 22 interposed therebetween, thus providing a capacitance. Thus, a capacitance can be obtained between first outer electrode 30a to which first inner electrode layer 24a is connected and second outer electrode 30b to which second inner electrode layer 24b is connected, so as to exhibit a characteristic of a capacitor.

Figure 5A:
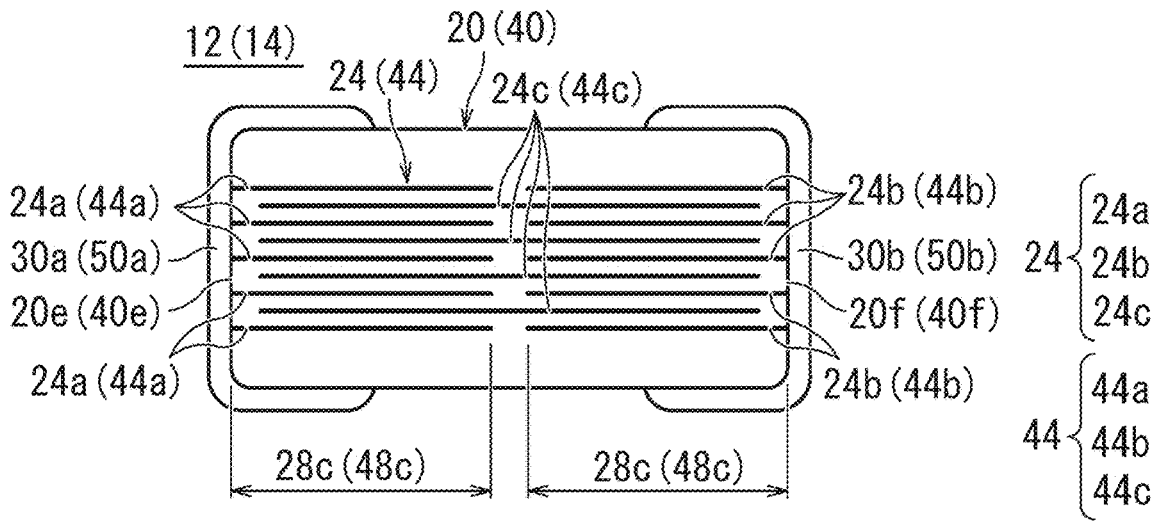
FIG. 5A is a cross-sectional view showing a structure in which a facing electrode portion of an inner electrode layer of a multilayer ceramic capacitor according to a preferred embodiment of the present invention is divided into two sections.
Figure 5B:
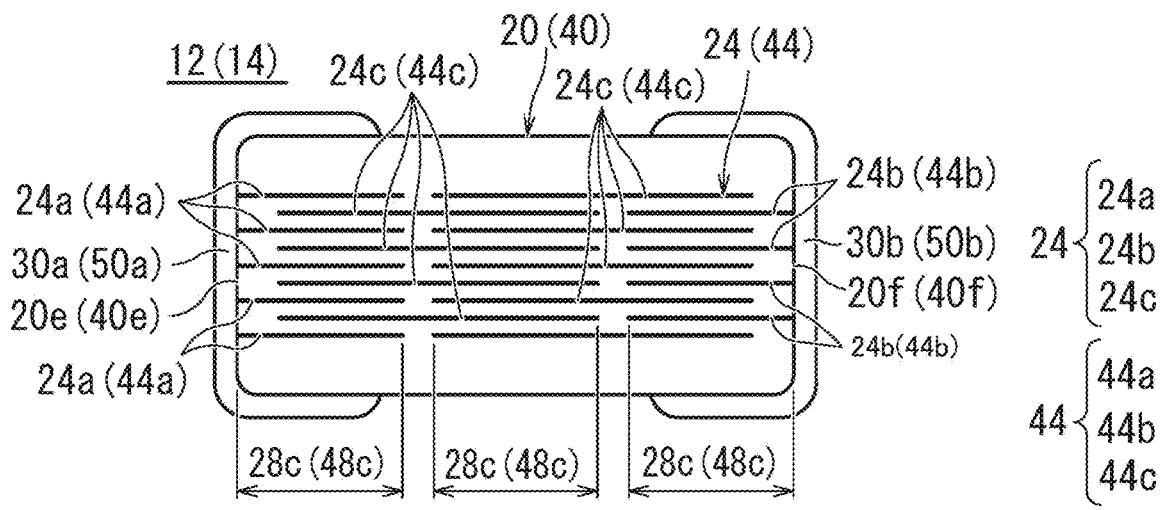
FIG. 5B is a cross-sectional view showing a structure in which the facing electrode portion of the inner electrode layer of a multilayer ceramic capacitor according to a preferred embodiment of the present invention is divided into three sections.
Figure 5C:
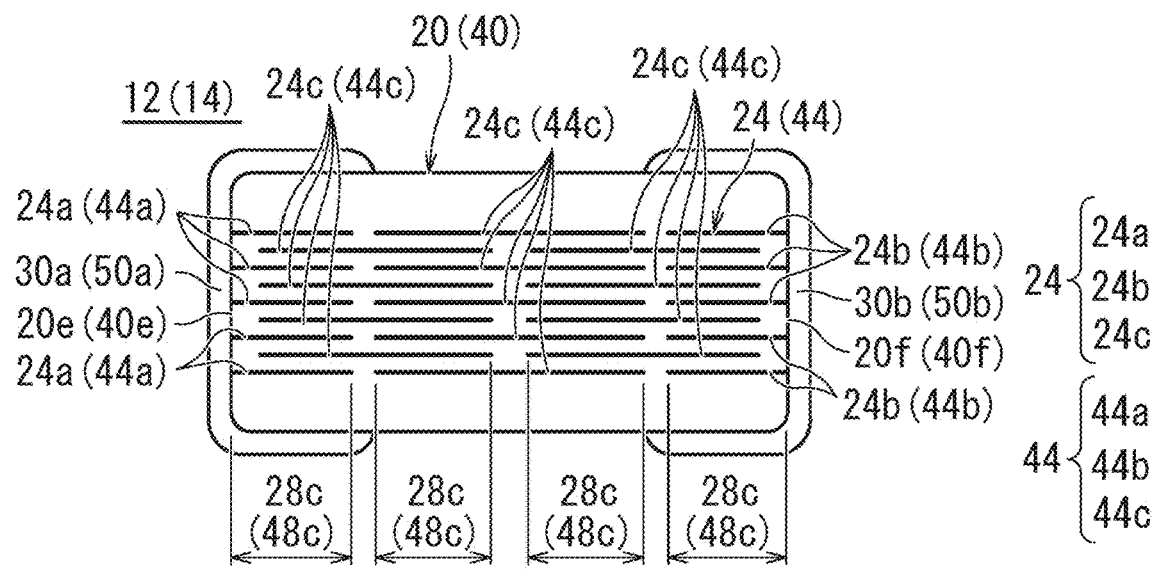
FIG. 5C is a cross-sectional view showing a structure in which the facing electrode portion of the inner electrode layer of a multilayer ceramic capacitor according to a preferred embodiment of the present invention is divided into four sections.

As inner electrode layer 24, float inner electrode layers 24c not extending to each of first end surface 20e and second end surface 20f may be provided, in addition to first inner electrode layer 24a and second inner electrode layer 24b, as shown in FIGS. 5A to 5C, thus providing a structure in which facing electrode portion 28c is divided into a plurality of sections by float inner electrode layers 24c. Examples of the structure include a 2-stage structure as shown in FIG. 5A, a 3-stage structure as shown in FIG. 5B, a 4-stage structure as shown in FIG. 5C, and 4-or-more-stage structure. With the structure including facing electrode portion 28c divided into a plurality of sections in this manner results in a configuration in which a plurality of capacitor components are provided between inner electrode layers 24a, 24b, and 24c facing each other and these capacitor components are connected in series. Thus, a relatively low voltage is applied to each capacitor component, so that the multilayer ceramic capacitor has an increased breakdown voltage.

As shown in FIG. 2, first outer electrode 30a includes a first underlying electrode layer 32a and a first plating layer 34a in this order from the first multilayer body 20 side. First plating layer 34a is disposed on the surface of first underlying electrode layer 32a. Similarly, second outer electrode 30b includes a second underlying electrode layer 32b and a second plating layer 34b in this order from the first multilayer body 20 side. Second plating layer 34b is disposed on the surface of second underlying electrode layer 32b.

First underlying electrode layer 32a is disposed on the surface of first end surface 20e of first multilayer body 20, and extends from first end surface 20e to cover a portion of each of first main surface 20a, second main surface 20b, first side surface 20c, and second side surface 20d. It should be noted that first underlying electrode layer 32a may be disposed only on the surface of first end surface 20e of first multilayer body 20.

Furthermore, second underlying electrode layer 32b is disposed on the surface of second end surface 20f of first multilayer body 20, and extends from second end surface 20f to cover a portion of each of first main surface 20a, second main surface 20b, first side surface 20c, and second side surface 20d. It should be noted that second underlying electrode layer 32b may be disposed only on the surface of second end surface 20f of first multilayer body 20.

First underlying electrode layer 32a and second underlying electrode layer 32b (hereinafter also simply referred to as an underlying electrode layer) each include at least one selected from a baked layer, a resin layer, a thin film layer, and the like. In the present preferred embodiment, specifically, first underlying electrode layer 38a and second underlying electrode layer 38b, each of which is a baked layer, will be described.

The baked layer includes glass and metal. Examples of the metal of the baked layer include at least one selected from Cu, Ni, Ag, Pd, an Ag—Pd alloy, Au, or the like. Moreover, the glass of the baked layer includes at least one selected from B, Si, Ba, Mg, Al, Li, or the like. A plurality of baked layers may be provided. The baked layer is obtained by applying, to first multilayer body 20, a conductive paste including glass and metal and baking it. The baked layer may be calcined together with ceramic layer 22 and inner electrode layer 24, or may be obtained by baking the calcined ceramic layer 22 and inner electrode layer 24.

The following is an explanation about the underlying electrode layer including first underlying electrode layer 32a and second underlying electrode layer 32b each formed of a conductive resin layer.

The conductive resin layer may be disposed on the surface of the baked layer so as to cover the baked layer, or may be disposed directly on the surface of first multilayer body 12.

The conductive resin layer includes a thermosetting resin and metal. The conductive resin layer thus including thermosetting resin is more excellent in flexibility than a conductive layer made of a plating film or a calcined conductive paste, for example. Accordingly, even when a physical impact or an impact resulting from heat cycle is applied to the multilayer ceramic capacitor, the conductive resin layer defines and functions as a buffer layer, thus preventing cracking from occurring in the multilayer ceramic capacitor.

As the metal included in the conductive resin layer, Ag, Cu, or an alloy thereof may preferably be used, for example. Moreover, metal powder with a surface coated with Ag, for example, can also be used. When the metal powder with a surface coated with Ag is used, it is preferable to use Cu or Ni, for example, as metal powder. Moreover, Cu subjected to an anti-oxidizing treatment can also be used. In particular, it is preferable to use conductive metal powder of Ag as metal included in the conductive resin layer because Ag is lowest in specific resistance among metals and therefore suitable for an electrode material, and also Ag is a noble metal and therefore not oxidized and exhibits a high weather resistance. It is also preferable to use metal coated with Ag as metal included in the conductive resin layer because an inexpensive metal can be used for the base material while maintaining the above-described characteristics of Ag.

The metal included in the conductive resin layer is preferably, for example, about 35 vol % or more and about 75 vol % or less with respect to the volume of the entire conductive resin.

The shape of the metal (electrically conductive filler) included in the conductive resin layer is not particularly limited. The electrically conductive filler may have a spherical shape, a flat shape or the like, but it is preferable to use a mixture of spherical-shaped metal powder and flat-shaped metal powder.

The average particle size of the metal (electrically conductive filler) included in the conductive resin layer is not particularly limited. The average particle size of the electrically conductive filler may preferably be about 0.3 μm or more and about 10 μm or less, for example.

The metal (electrically conductive filler) included in the conductive resin layer is mainly responsible for electrical conductivity of the conductive resin layer. Specifically, the electrically conductive fillers come into contact with each other to provide an electrical path in the conductive resin layer.

Examples of the resin of the conductive resin layer usable herein include various known thermosetting resins such as an epoxy resin, a phenol resin, an urethane resin, a silicone resin, or a polyimide resin. Among them, the epoxy resin that is excellent in heat resistance, moisture resistance, adhesiveness, and the like is one of preferred resins.

The resin included in the conductive resin layer is preferably, for example, about 25 vol % or more and about 65 vol % or less with respect to the volume of the entire conductive resin.

Moreover, the conductive resin layer preferably includes not only a thermosetting resin but also a curing agent. When the epoxy resin is used as a base resin, examples of the curing agent for the epoxy resin usable herein include various known compounds such as a phenol resin, an amine-based compound, an acid anhydride-based compound, and an imidazole-based compound.

The thickness of the conductive resin layer in the central portion of each of first underlying electrode layer 32a located on first end surface 20e in the height direction and second underlying electrode layer 32b located on second end surface 20f in the height direction is preferably about 15 μm or more and about 160 μm or less, for example.

Moreover, when underlying electrode layers are provided on the surfaces of first main surface 20a, second main surface 20b, first side surface 20c, and second side surface 20d, the thickness of the conductive resin layer in the central portion of each of first underlying electrode layer 32a and second underlying electrode layer 32b in the length direction that are located on the surfaces of first main surface 20a, second main surface 20b, first side surface 20c and second side surface 20d is preferably about 5 μm or more and about 40 μm or less, for example.

Furthermore, when the underlying electrode layer is a thin film layer, the thin film layer is formed by, for example, a thin film forming method such as a sputtering method or a vapor deposition method such that metal particles are deposited to form a layer of about 1 μm or less.

First plating layer 34a is disposed on the surface of first underlying electrode layer 32a so as to cover the surface. Similarly, second plating layer 34b is disposed on the surface of second underlying electrode layer 32b so as to cover the surface.

Furthermore, first plating layer 34a and second plating layer 34b (hereinafter also simply referred to as a plating layer) are formed, for example, using at least one metal selected from Cu, Ni, Sn, Ag, Pd, an Ag—Pd alloy, Au or the like, or using an alloy containing the metal(s).

The plating layer may include a plurality of layers. In this case, the plating layer preferably has a two-layer structure including an Ni plating layer and an Sn plating layer, for example. As the Ni plating layer is provided to cover the surface of the underlying electrode layer, the underlying electrode layer can be prevented from being eroded by solder used when multilayer ceramic electronic component 10 is mounted on a mounting substrate. Moreover, by providing an Sn plating layer on the surface of the Ni plating layer, wettability of the solder used for connecting a metal terminal to multilayer ceramic electronic component 10 can be improved, and thereby, mounting can be facilitated.

The thickness of one plating layer is preferably about 2 μm or more and about 10 μm or less, for example. It is preferable that the plating layer does not include glass. Furthermore, a ratio of metal per unit volume of the plating layer is preferably about 99 vol % or more, for example.

The following is an explanation about the case where first underlying electrode layer 32a and second underlying electrode layer 32b each are defined by a plating electrode. First underlying electrode layer 32a is defined by a plating layer directly connected to inner electrode layer 24, and disposed directly on the surface of first end surface 20e of first multilayer body 20. Also, first underlying electrode layer 32a extends from first end surface 20e to cover a portion of each of first main surface 20a, second main surface 20b, first side surface 20c, and second side surface 20d.

Furthermore, second underlying electrode layer 32b is defined by a plating layer directly connected to inner electrode layer 24 and disposed directly on the surface of second end surface 20f of first multilayer body 20. Also, second underlying electrode layer 32b extends from second end surface 20f to cover a part of each of first main surface 20a, second main surface 20b, first side surface 20c, and second side surface 20d.

In order to form first underlying electrode layer 32a and second underlying electrode layer 32b from plating layers, a catalyst is provided on first multilayer body 20 as a preprocess.

It is preferable that first underlying electrode layer 32a defined by a plating layer is covered by first plating layer 34a. Similarly, it is preferable that second underlying electrode layer 32b defined by a plating layer is covered by second plating layer 34b.

First underlying electrode layer 32a, second underlying electrode layer 32b, first plating layer 34a, and second plating layer 34b each preferably include plating of at least one metal selected from Cu, Ni, Sn, Pd, Au, Ag, Pd, Bi, Zn, or the like; or an alloy containing the metal(s), for example.

First plating layer 34a and second plating layer 34b are provided as required. First outer electrode 30a may include only first underlying electrode layers 32a, and second outer electrode 30b may include only second underlying electrode layer 32b. Furthermore, first plating layer 34a and second plating layer 34b may be provided as the outermost layers of first outer electrode 30a and second outer electrode 30b, respectively. Also, other plating layers may be provided on first plating layer 34a or second plating layer 34b.

The thickness of one plating layer is preferably about 1 μm or more and about 15 μm or less, for example. It is preferable that the plating layer does not include glass. A ratio of metal per unit volume of the plating layer is preferably about 99 vol % or more, for example.

(B) Second Multilayer Ceramic Electronic Component Body

Second multilayer ceramic electronic component body 14 has the same or substantially the same configuration as that of first multilayer ceramic electronic component body 12. Thus, the same portions as those in first multilayer ceramic electronic component body 12 will be denoted by the same reference characters, and the detailed description thereof will not be repeated.

(i) Second Multilayer Body

As shown in FIGS. 1 to 4, second multilayer body 40 includes a plurality of stacked ceramic layers 42 and a plurality of stacked inner electrode layers 44. Furthermore, second multilayer body 40 includes a third main surface 40a and a fourth main surface 40b that face each other in the stacking direction, a third side surface 40c and a fourth side surface 40d that face each other in the width direction orthogonal or substantially orthogonal to the stacking direction, and a third end surface 40e and a fourth end surface 40f that face each other in the length direction orthogonal or substantially orthogonal to the stacking direction and the width direction.

Second multilayer body 40 includes a corner portion and a ridgeline portion, each of which is preferably rounded. In this case, the corner portion corresponds to a portion at which adjoining three planes of the multilayer body cross each other. The ridgeline portion corresponds to a portion at which adjoining two planes of the multilayer body cross each other. Furthermore, third main surface 40a, fourth main surface 40b, third side surface 40c, fourth side surface 40d, third end surface 40e, and fourth end surface 40f each may be partially or entirely provided with projections and recesses, and the like.

Second multilayer body 40 includes an outer layer portion 43a including a plurality of ceramic layers 42, and an inner layer portion 43b including a single ceramic layer 42 or a plurality of ceramic layers 42 and a plurality of inner electrode layers 44 respectively disposed thereon. Outer layer portion 43a is located on each of the third main surface 40a side and the fourth main surface 40b side of second multilayer body 40, and includes a plurality of ceramic layers 42 located between third main surface 40a and inner electrode layer 44 that is closest to third main surface 40a, and a plurality of ceramic layers 22 located between fourth main surface 40b and inner electrode layer 44 that is closest to fourth main surface 40b. Inner layer portion 43b is sandwiched between both outer layer portions 43a. In other words, inner layer portion 43b includes inner electrode layer 44 while outer layer portion 43a does not include inner electrode layer 44.

Ceramic layer 42 of second multilayer body 40 can be made using the same material as that of ceramic layer 22 of first multilayer body 20.

The thickness of calcined ceramic layer 42 is preferably about 0.5 μm or more and about 10 μm or less, for example.

Second multilayer body 40 includes, as the plurality of inner electrode layers 44, a plurality of third inner electrode layers 44a and a plurality of fourth inner electrode layers 44b each having a rectangular or substantially rectangular shape, for example. The plurality of third inner electrode layers 44a and the plurality of fourth inner electrode layers 44b are buried so as to be alternately arranged at regular intervals in the stacking direction of second multilayer body 40. In this case, each of inner electrode layers 44 may be disposed not on a single ceramic layer 42 but on a plurality of stacked ceramic layers 42.

It should be noted that each third inner electrode layer 44a and each fourth inner electrode layer 44b may be in parallel or substantially parallel with a mounting surface, or may be disposed to be vertical (perpendicular or substantially perpendicular) to the mounting surface.

Third inner electrode layer 44a includes a third facing electrode portion 48a that faces fourth inner electrode layer 44b, and a third extending electrode portion 46a located on one end side of third inner electrode layer 44a and extending from third facing electrode portion 48a to third end surface 40e of second multilayer body 40. Third extending electrode portion 46a includes an end portion extending to third end surface 40e and exposed from third end surface 40e.

Fourth inner electrode layer 44b includes a fourth facing electrode portion 48b that faces third inner electrode layer 44a; and a fourth extending electrode portion 46b located on one end side of fourth inner electrode layer 44b and extending from fourth facing electrode portion 48b to fourth end surface 40f of second multilayer body 40. Fourth extending electrode portion 46b includes an end portion extending to fourth end surface 40f and exposed from fourth end surface 40f.

It is preferable that third facing electrode portion 48a of third inner electrode layer 44a and fourth facing electrode portion 48b of fourth inner electrode layer 44b each have a rectangular or substantially rectangular shape without particular limitation. Also, the corner portion may be rounded or may have a slope shape (e.g., a taper shape).

It is preferable that third extending electrode portion 46a of third inner electrode layer 44a and fourth extending electrode portion 46b of fourth inner electrode layer 44b each have a rectangular or substantially rectangular shape without particular limitation. Also, the corner portion may be rounded or may have a slope shape (e.g., a taper shape).

Third facing electrode portion 48a of third inner electrode layer 44a and third extending electrode portion 46a of third inner electrode layer 44a may have the same or substantially the same width, or one of the widths may be narrower than the other. Similarly, fourth facing electrode portion 48b of fourth inner electrode layer 44b and fourth extending electrode portion 46b of fourth inner electrode layer 44b may have the same or substantially the same width, or one of the widths may be narrower than the other.

Third inner electrode layer 44a and fourth inner electrode layer 44b may extend to only third end surface 40e and fourth end surface 40f, or may have a T-shape so as to extend to not only reach third end surface 40e and fourth end surface 40f but also reach third side surface 40c and fourth side surface 40d.

Second multilayer body 40 includes a side portion (W gap) 49a that is provided between third side surface 40c and one ends of third facing electrode portion 48a and fourth facing electrode portion 48b in the width direction, and between fourth side surface 40d and the other ends of third facing electrode portion 48a and fourth facing electrode portion 48b in the width direction. Furthermore, second multilayer body 40 includes an end portion (an L gap) 49b that is provided between fourth end surface 40f and the end portion of third inner electrode layer 44a that is opposite to third extending electrode portion 46a, and between third end surface 40e and the end portion of fourth inner electrode layer 44b that is opposite to fourth extending electrode portion 46b.

Inner electrode layer 44 can be made using the same material as that of inner electrode layer 24.

The thickness of inner electrode layer 44 is preferably about 0.2 μm or more and about 3.0 μm or less, for example.

(ii) Third Outer Electrode and Fourth Outer Electrode

Third outer electrode 50a is disposed on the third end surface 40e side of second multilayer body 40, and fourth outer electrode 50b is disposed on the fourth end surface 40f side of second multilayer body 40.

Third outer electrode 50a is disposed on the surface of third end surface 40e of second multilayer body 40, and extends from third end surface 40e to cover a portion of each of third main surface 40a, fourth main surface 40b, third side surface 40c, and fourth side surface 40d. In this case, third outer electrode 50a is electrically connected to third extending electrode 46a of third inner electrode layer 44a. It should be noted that third outer electrode 50a may be disposed only on the surface of third end surface 40e of second multilayer body 40.

Fourth outer electrode 50b is disposed on the surface of fourth end surface 40f of second multilayer body 40, and extends from fourth end surface 40f to cover a portion of each of third main surface 40a, fourth main surface 40b, third side surface 40c, and fourth side surface 40d. In this case, fourth outer electrode 50b is electrically connected to fourth extending electrode 46b of fourth inner electrode layer 44b. It should be noted that fourth outer electrode 50b may be disposed only on the surface of fourth end surface 40f of second multilayer body 40. It is preferable that fourth outer electrode 50b is at least disposed only on a portion on fourth main surface 40b that is to be located on the side of second multilayer body 40 that is close to the mounting surface. This allows second metal terminal 18 to be connected on the side of second multilayer body 40 that is close to the mounting surface, thus enabling a lower profile.

On the inside of second multilayer body 40, third facing electrode portion 48a of third inner electrode layer 44a and fourth facing electrode portion 48b of fourth inner electrode layer 44b face each other with ceramic layer 42 interposed therebetween, thus providing a capacitance. Thus, a capacitance can be obtained between third outer electrode 50a to which third inner electrode layer 44a is connected and fourth outer electrode 50b to which fourth inner electrode layer 44b is connected, thus exhibiting a characteristic of a capacitor.

As shown in FIGS. 5A to 5C, as inner electrode layer 44, a float inner electrode layer 44c not extending to each of third end surface 40e and fourth end surface 40f may be provided, in addition to first inner electrode layer 44a and fourth inner electrode layer 44b, as shown in FIG. 5, thus providing a structure in which facing electrode portion 48c is divided into a plurality of sections by float inner electrode layers 44c. Examples of the structure include a 2-stage structure as shown in FIG. 5A, a 3-stage structure as shown in FIG. 5B, a 4-stage structure as shown in FIG. 5C, and 4-or-more-stage structure. With the structure including facing electrode portion 48c divided into a plurality of sections in this way leads to a configuration, in which a plurality of capacitor components are provided between inner electrode layers 44a, 44b, and 44c facing each other, and these capacitor components are connected in series. Accordingly, a relatively low voltage is applied to each capacitor component, so that the multilayer ceramic capacitor has an increased breakdown voltage.

As shown in FIG. 2, third outer electrode 50a includes a third underlying electrode layer 52a and a third plating layer 54a in this order from the second multilayer body 40 side. Third plating layer 54a is disposed on the surface of third underlying electrode layer 52a. Similarly, fourth outer electrode 50b includes a fourth underlying electrode layer 52b and a fourth plating layer 54b in this order from the second multilayer body 40 side. Fourth plating layer 54b is disposed on the surface of fourth underlying electrode layer 52b.

Third underlying electrode layer 52a is disposed on the surface of third end surface 40e of second multilayer body 40, and extends from third end surface 40e to cover a portion of each of third main surface 40a, fourth main surface 40b, third side surface 40c, and fourth side surface 40d. It should be noted that third underlying electrode layer 52a may be disposed only on the surface of third end surface 40e of second multilayer body 40.

Furthermore, fourth underlying electrode layer 52b is disposed on the surface of fourth end surface 40f of second multilayer body 40, and extends from fourth end surface 40f to cover a portion of each of third main surface 40a, fourth main surface 40b, third side surface 40c, and fourth side surface 40d. It should be noted that fourth underlying electrode layer 52b may be disposed only on the surface of fourth end surface 40f of second multilayer body 40.

Third underlying electrode layer 52a and fourth underlying electrode layer 52b (hereinafter also simply referred to as an underlying electrode layer) each include at least one selected from a baked layer, a resin layer, a thin film layer, and the like.

Third plating layer 54a is disposed on the surface of third underlying electrode layer 52a so as to cover the surface. Similarly, fourth plating layer 54b is disposed on the surface of fourth underlying electrode layer 52b so as to cover the surface.

(C) Metal Terminal

The metal terminals include first metal terminal 16, second metal terminal 18, and third metal terminal 19.

First metal terminal 16 is connected to first outer electrode 30a. Second metal terminal 18 is connected to fourth outer electrode 50b. Third metal terminal 19 is connected to extend over second outer electrode 30b of first multilayer ceramic electronic component body 12 and third outer electrode 50a of second multilayer ceramic electronic component body 14. Also, third metal terminal 19 is exposed from outer casing 500, which will be described later.

First metal terminal 16 includes a first joining portion 62 connected to first outer electrode 30a located on second main surface 20b of first multilayer body 20 to face second main surface 20b, a first extension portion 64 connected to first joining portion 62 and extending from first joining portion 62 in the direction that connects first end surface 20e and second end surface 20f of first multilayer body 20, a second extension portion 65 connected to first extension portion 64 and extending in the direction of the mounting surface so as to provide a gap between the mounting surface and second main surface 20b of first multilayer body 20 that faces the mounting surface, and a first mounting portion 66 connected to second extension portion 65 and extending from second extension portion 65 in parallel or substantially in parallel with the mounting surface. As second extension portion 65 is provided, the distance from the mounting substrate can be increased, so that the advantageous effect of relieving the stress from the mounting substrate can be achieved.

Second metal terminal 18 includes a second joining portion 82 connected to fourth outer electrode 50b located on fourth main surface 40b of second multilayer body 40 to face fourth main surface 40b, a third extension portion 84 extending from second joining portion 82 in the direction that connects third end surface 40e and fourth end surface 40f of second multilayer body 40, a fourth extension portion 85 connected to third extension portion 84 and extending in the direction of the mounting surface so as to provide a gap between the mounting surface and fourth main surface 40b of second multilayer body 40 that faces the mounting surface, and a second mounting portion 86 connected to fourth extension portion 85 and extending from fourth extension portion 85 in parallel or substantially in parallel with the mounting surface. As fourth extension portion 85 is provided, the distance from the mounting substrate can be increased, so that the advantageous effect of relieving the stress from the mounting substrate can be achieved.

First metal terminal 16 and second metal terminal 18 are provided to mount multilayer ceramic electronic component 10 on the mounting substrate. First metal terminal 16 and second metal terminal 18 each are defined by a plate-shaped lead frame, for example.

First metal terminal 16 and second metal terminal 18 each defined by such a plate-shaped lead frame include first main surfaces connected to first outer electrode 30a and fourth outer electrode 50b, respectively, second main surfaces opposite to the respective first main surfaces (the surfaces opposite to each multilayer ceramic electronic component body), and circumferential surfaces each providing a thickness between the first main surface and the second main surface.

First joining portion 62 of first metal terminal 16 is connected to first outer electrode 30a located on second main surface 20b of first multilayer body 20 to face second main surface 20b of first multilayer body 20. It is preferable that first joining portion 62, for example, have a rectangular or substantially rectangular plate shape having the same or substantially the same width as that of first outer electrode 30a on first end surface 20e of first multilayer body 20 and includes one surface connected to first outer electrode 30a by joining material 70. Furthermore, first joining portion 62 may have any shape not limited to a rectangular or substantially rectangular shape, and may include a notch or a hole. It should be noted that the number of notches or holes may be one or may be more than one.

Second joining portion 82 of second metal terminal 18 is connected to fourth outer electrode 50b located on fourth main surface 40b of second multilayer body 40 to face fourth main surface 40b of second multilayer body 40. It is preferable that second joining portion 82, for example, has a rectangular or substantially rectangular plate shape having the same or substantially the same width as that of fourth outer electrode 50b on fourth end surface 40f of second multilayer body 40 and include one surface connected to fourth outer electrode 50b by joining material 70. Furthermore, second joining portion 82 may have any shape not limited to a rectangular or substantially rectangular shape, and may include a notch or a hole. It should be noted that the number of notches or holes may be one or may be more than one.

First joining portion 62 of first metal terminal 16 is connected to first outer electrode 30a by joining material 70. Second joining portion 82 of second metal terminal 18 is connected to fourth outer electrode 50b by joining material 70.

Furthermore, joining material 70 used to join first outer electrode 30a to first joining portion 62 or used to join fourth outer electrode 50b to second joining portion 82 may preferably be solder, an electrically conductive adhesive, a transient liquid-phase sintering (TLP) material, for example. When solder is used as a joining material, LF solder such as Sn—Sb based solder, Sn—Ag—Cu based solder, Sn—Cu based solder, and Sn—Bi based solder can be used. In particular, in the case where Sn—Sb based solder is used, the content of Sb is preferably about 5% or more and about 15% or less, for example.

First extension portion 64 of first metal terminal 16 is connected to first joining portion 62, and extends to be spaced away from first multilayer body 20 in the direction in parallel or substantially in parallel with first main surface 20a or second main surface 20b of first multilayer body 20. Thus, thermal shock can be less likely to be applied to multilayer ceramic electronic component body 12. Furthermore, even stress caused by a temperature change or deformation of the mounting substrate can also be advantageously absorbed by elastic deformation of the metal terminals. Furthermore, the distance of first metal terminal 16 that is molded by outer casing 500 can be increased, with the result that the distance along the insulated surface between conductors (creepage distance) can be ensured.

Also, the length of first extension portion 64 of first metal terminal 16 that extends in length direction Z of multilayer ceramic electronic component 10 is not particularly limited.

Furthermore, the length of first extension portion 64 of first metal terminal 16 in the width direction of first multilayer body 20 may be the same or substantially the same as the length of first joining portion 62, but may be gradually shortened in a step shape or may be shortened in a taper shape.

First extension portion 64 of first metal terminal 16 includes a surface that is partially processed in a recessed shape. Through this processed portion, the base material of first metal terminal 16 may be exposed. Thus, even if joining material 70 in first joining portion 62 of first metal terminal 16 is melted, the base material of first metal terminal 16 is exposed through this processed portion having a recessed shape to thus reduce the wettability of solder, and thus, flowing out of this solder can be prevented, with the result that flowing out of the melted solder to the outside of outer casing 500 can be reduced or prevented.

Furthermore, first extension portion 64 of first metal terminal 16 may be provided with a notch portion. Thus, the material amount of first metal terminal 16 can be reduced, so that the cost reduction effect can be achieved. Furthermore, the advantageous effect of relieving the stress from the substrate after mounting of the substrate can be achieved.

Third extension portion 84 of second metal terminal 18 is connected to second joining portion 82 and extends to be spaced away from second multilayer body 40 in the direction in parallel or substantially in parallel with third main surface 40a or fourth main surface 40b of second multilayer body 40. Thus, thermal shock can be less likely to be applied to multilayer ceramic electronic component body 14. Furthermore, even stress caused by a temperature change or deformation of the mounting substrate can also be advantageously absorbed by elastic deformation of the metal terminals. Furthermore, the distance of second metal terminal 18 that is molded by outer casing 500 can be increased, with the result that the distance along the insulated surface between conductors (creepage distance) can be ensured.

Also, the length of third extension portion 84 of second metal terminal 18 that extends in length direction Z of multilayer ceramic electronic component 10 is not particularly limited.

Furthermore, the length of third extension portion 84 of second metal terminal 18 in the width direction of second multilayer body 40 may be the same or substantially the same as the length of second joining portion 82, but may be gradually shortened in a step shape or may be shortened in a taper shape.

Third extension portion 84 of second metal terminal 18 includes a surface that is partially processed in a recessed shape. Through this processed portion, the base material of second metal terminal 18 may be exposed. Thus, even if joining material 70 in second joining portion 82 of second metal terminal 18 is melted, the base material of second metal terminal 18 is exposed through this processed portion having a recessed shape to thus reduce the wettability of solder, and thus, flowing out of this solder can be prevented, with the result that flowing out of the melted solder to the outside of outer casing 500 can be reduced or prevented.

Furthermore, third extension portion 84 of second metal terminal 18 may be provided with a notch portion. Thus, the material amount of second metal terminal 18 can be reduced, so that the cost reduction effect can be achieved. Furthermore, the advantageous effect of relieving the stress from the substrate after mounting of the substrate can be achieved.

Second extension portion 65 of first metal terminal 16 is connected to first extension portion 64, and extends in the direction of the mounting surface so as to provide a gap between the mounting surface and second main surface 20b of first multilayer body 20 that faces the mounting surface. Specifically, second extension portion 65 curves from the end of first extension portion 64 and extends in the direction of the mounting surface. It should be noted that this curved portion may be gently curved at an obtuse angle or may be curved at an approximately right angle. Thus, the distance from the mounting substrate can be increased, so that the advantageous effect of relieving the stress from the mounting substrate can be achieved. Furthermore, the thickness of outer casing 500 below first multilayer ceramic electronic component body 12 and second multilayer ceramic electronic component body 14 can be increased, and thus, the insulating property can be ensured.

The length of second extension portion 65 of first metal terminal 16 in the length direction of each of first multilayer ceramic electronic component body 12 and second multilayer ceramic electronic component body 14 is not particularly limited, but may be the same or approximately the same as the length of first extension portion 64 extending along the length of first multilayer ceramic electronic component body 12.

The length of second extension portion 65 extending to the mounting surface is not particularly limited, but is set to provide a gap between the mounting surface and the surface of outer casing 500 (described later) that faces the mounting surface, and may preferably be set to be about 0.15 mm or more and about 2 mm or less, for example. Thus, as first multilayer ceramic electronic component body 12 and second multilayer ceramic electronic component body 14 that are covered by outer casing 500 are floated from the mounting surface in this way, the distance from the mounting substrate can be increased, so that the advantageous effect of relieving the stress from the mounting substrate can be achieved. Furthermore, the resin thickness of outer casing 500 on the lower side can be increased, and thus, the insulating property can be ensured.

Second extension portion 65 includes a surface that is partially processed in a recessed shape as in first extension portion 64. Through this processed portion, the base material of the metal terminal may be exposed. Thus, even if joining material 70 in first joining portion 62 is melted, the base material of the metal terminal is exposed through this processed portion having a recessed shape to thus reduce the wettability of solder, and thus, flowing out of this solder can be prevented, with the result that flowing out of the melted solder to the outside of outer casing 500 can be reduced or prevented.

Furthermore, the central portion of second extension portion 65 may be provided with a notch portion so as to be divided into two forks or two or more forks. Thus, the advantageous effect of relieving the stress from the substrate after mounting of the substrate can be achieved.

Fourth extension portion 85 of second metal terminal 18 is connected to third extension portion 84, and extends in the direction of the mounting surface so as to provide a gap between the mounting surface and fourth main surface 40*b* of second multilayer body 40 that is to face the mounting surface. Specifically, fourth extension portion 85 curves from the end of third extension portion 84 and extends in the direction of the mounting surface. It should be noted that this curved portion may be gently curved at an obtuse angle or may be curved at an approximately right angle. Thus, the distance from the mounting substrate can be increased, so that the advantageous effect of relieving the stress from the mounting substrate can be achieved. Furthermore, the thickness of outer casing 500 below first multilayer ceramic electronic component body 12 and second multilayer ceramic electronic component body 14 can be increased, and thus, the insulating property can be ensured.

The length of fourth extension portion 85 of second metal terminal 18 in the length direction of each of first multilayer ceramic electronic component body 12 and second multilayer ceramic electronic component body 14 is not particularly limited, but may be the same or approximately the same as the length of third extension portion 84 extending along the length of second multilayer ceramic electronic component body 14.

The length of fourth extension portion 85 extending to the mounting surface is not particularly limited, but is set to provide a gap between the mounting surface and the surface of outer casing 500 (described later) that faces the mounting surface, and may preferably be set to be about 0.15 mm or more and about 2 mm or less, for example. Thus, as first multilayer ceramic electronic component body 12 and second multilayer ceramic electronic component body 14 that are covered by outer casing 500 are floated from the mounting surface in this way, the distance from the mounting substrate can be increased, so that the advantageous effect of relieving the stress from the mounting substrate can be achieved. Furthermore, the resin thickness of outer casing 500 on the lower side can be increased, and thus, the insulating property can be ensured.

Fourth extension portion 85 includes a surface that is partially processed in a recessed shape as in third extension portion 84. Through this processed portion, the base material of the metal terminal may be exposed. Thus, even if joining material 70 in second joining portion 82 is melted, the base material of the metal terminal is exposed through this processed portion having a recessed shape to thus reduces the wettability of solder, and thus, flowing out of this solder can be prevented, with the result that flowing out of the melted solder to the outside of outer casing 500 can be reduced or prevented.

Furthermore, the central portion of fourth extension portion 85 may be provided with a notch portion so as to be divided into two forks or two or more forks. Thus, the advantageous effect of relieving the stress from the substrate after mounting of the substrate can be achieved.

First mounting portion 66 of first metal terminal 16 is connected to second extension portion 65, and extends from second extension portion 65 in the direction that connects end surfaces of first end surface 20*e* and second end surface 20*f* of first multilayer body 20. The first mounting portion 66 enables mounting on the mounting substrate.

First mounting portion 66 of first metal terminal 16 is bent to extend from the end portion of second extension portion 65 in the length direction that connects the end surfaces of first end surface 20*e* and second end surface 20*f*. It should be noted that first mounting portion 66 may be bent in the direction toward first multilayer body 20 and second multilayer body 40 or may be bent in the direction opposite to first multilayer body 20 and second multilayer body 40.

The length of first mounting portion 66 of first metal terminal 16 in the length direction that connects first end surface 20*e* and second end surface 20*f* is not particularly limited, but may be longer than the length of first outer electrode 30*a* in the length direction that is provided on second main surface 20*b* (on the side close to the mounting surface) of first multilayer body 20.

Second mounting portion 86 of second metal terminal 18 is connected to fourth extension portion 85 and extends from fourth extension portion 85 in the direction that connects third end surface 40*e* and fourth end surface 40*f* of second multilayer body 40. This second mounting portion 86 enables mounting on the mounting substrate.

Second mounting portion 86 of second metal terminal 18 is bent to extend from the end portion of fourth extension portion 85 in the length direction that connects the end surfaces of third end surface 40*e* and fourth end surface 40*f*. It should be noted that second mounting portion 86 may be bent in the direction toward first multilayer body 20 and second multilayer body 40 or may be bent in the direction opposite to first multilayer body 20 and second multilayer body 40.

The length of second mounting portion 86 of second metal terminal 18 in the length direction that connects third end surface 40*e* and fourth end surface 40*f* is not particularly limited, but may be longer than the length of fourth outer electrode 50*b* in the length direction that is provided on fourth main surface 40*b* (on the side close to the mounting surface) of second multilayer body 40.

As shown in FIG. 2, third metal terminal 19 includes a third joining portion 92 connected to second outer electrode 30*b* of first multilayer ceramic electronic component body 12, and a fourth joining portion 94 connected to third outer electrode 50*a* of second multilayer ceramic electronic component body 14. It should be noted that a fifth extension portion 96 may be provided between third joining portion 92 and fourth joining portion 94.

Third metal terminal 19 is used to measure an IR value in characteristics selection. Specifically, when the IR value of first multilayer ceramic electronic component body 12 is measured, measurement terminals are connected to first metal terminal 16 and third metal terminal 19 to measure the IR value of first multilayer ceramic electronic component body 12. When the IR value of second multilayer ceramic electronic component body 14 is measured, measurement terminals are connected to second metal terminal 18 and third metal terminal 19 to measure the IR value of second multilayer ceramic electronic component body 14.

Thus, when the IR value of one of first multilayer ceramic electronic component body 12 and second multilayer ceramic electronic component body 14 that are connected in series and covered by outer casing 500 is less than the lower limit of the standard IR value, such a multilayer ceramic electronic component body can be reliably removed by characteristics selection. Thus, according to the present preferred embodiment, even in the case where the product quality is excellent in terms of the total sum of the insulation resistance values (IR values) of first and second multilayer ceramic electronic component bodies 12 and 14 that are connected in series and covered by outer casing 500, a multilayer ceramic electronic component 10 including a single multilayer ceramic electronic component body having an IR value less than the lower limit of the standard IR value among first and second multilayer ceramic electronic component bodies 12 and 14 can be selected as a defective product. Therefore, multilayer ceramic electronic component 10 with excellent quality can be provided that includes multilayer ceramic electronic component bodies each having an IR value that reliably exceeds the standard IR value.

Third metal terminal 19 is defined by a plate-shaped lead frame, for example. The lead frame may not have a plate shape but may have a thick block shape, for example. Third metal terminal 19 defined by such a plate-shaped lead frame includes a first main surface connected to second outer electrode 30b and third outer electrode 50a, a second main surface opposite to the first main surface (the surface on the side opposite to the multilayer ceramic electronic component bodies), and a circumferential surface that provides a thickness between the first main surface and the second main surface.

Third metal terminal 19 may be made using the same or substantially the same material as that of first metal terminal 16 and second metal terminal 18, but does not need to include a plating layer (for example, Ni plating, Sn plating) provided thereon for mounting, since the third metal terminal 19 is intended only for electrical measurement.

Furthermore, third metal terminal 19 may be made not only of metal but also of a material having conductivity not influencing the measurement. Third metal terminal 19 may be made using general metals, graphite, semiconductors, conductive polymers, and the like, for example. The thickness of third metal terminal 19 is not particularly limited.

Third joining portion 92 of third metal terminal 19 is connected to second outer electrode 30b of first multilayer ceramic electronic component body 12 by joining material 70, as shown in FIG. 2.

Fourth joining portion 94 of third metal terminal 19 is connected to third outer electrode 50a of second multilayer ceramic electronic component body 14 by joining material 70, as shown in FIG. 2.

Joining material 70 used for joining second outer electrode 30b to third joining portion 92, and for joining third outer electrode 50a to fourth joining portion 94 may preferably be made using solder, an electrically conductive adhesive, and a transient liquid-phase sintering (TLP) material, for example.

When solder is used as joining material 70, LF solder such as Sn—Sb based solder, Sn—Ag—Cu based solder, Sn—Cu based solder, and Sn—Bi based solder may preferably be used, for example. In particular, in the case where Sn—Sb based solder is used, the content of Sb is preferably about 5% or more and about 15% or less, for example.

Figure 6:
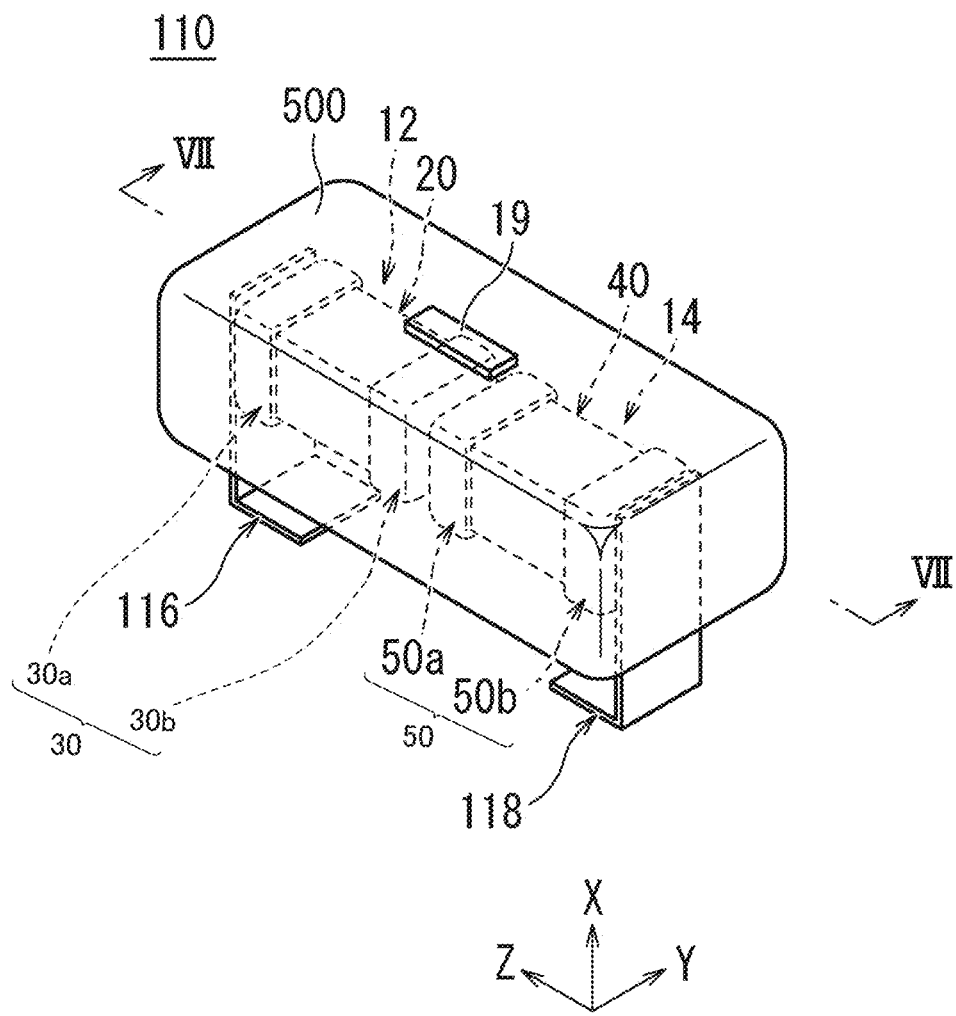
FIG. 6 is an external perspective view showing an example of the multilayer ceramic electronic component including a modification of metal terminals shown in FIG. 1.
Figure 7:
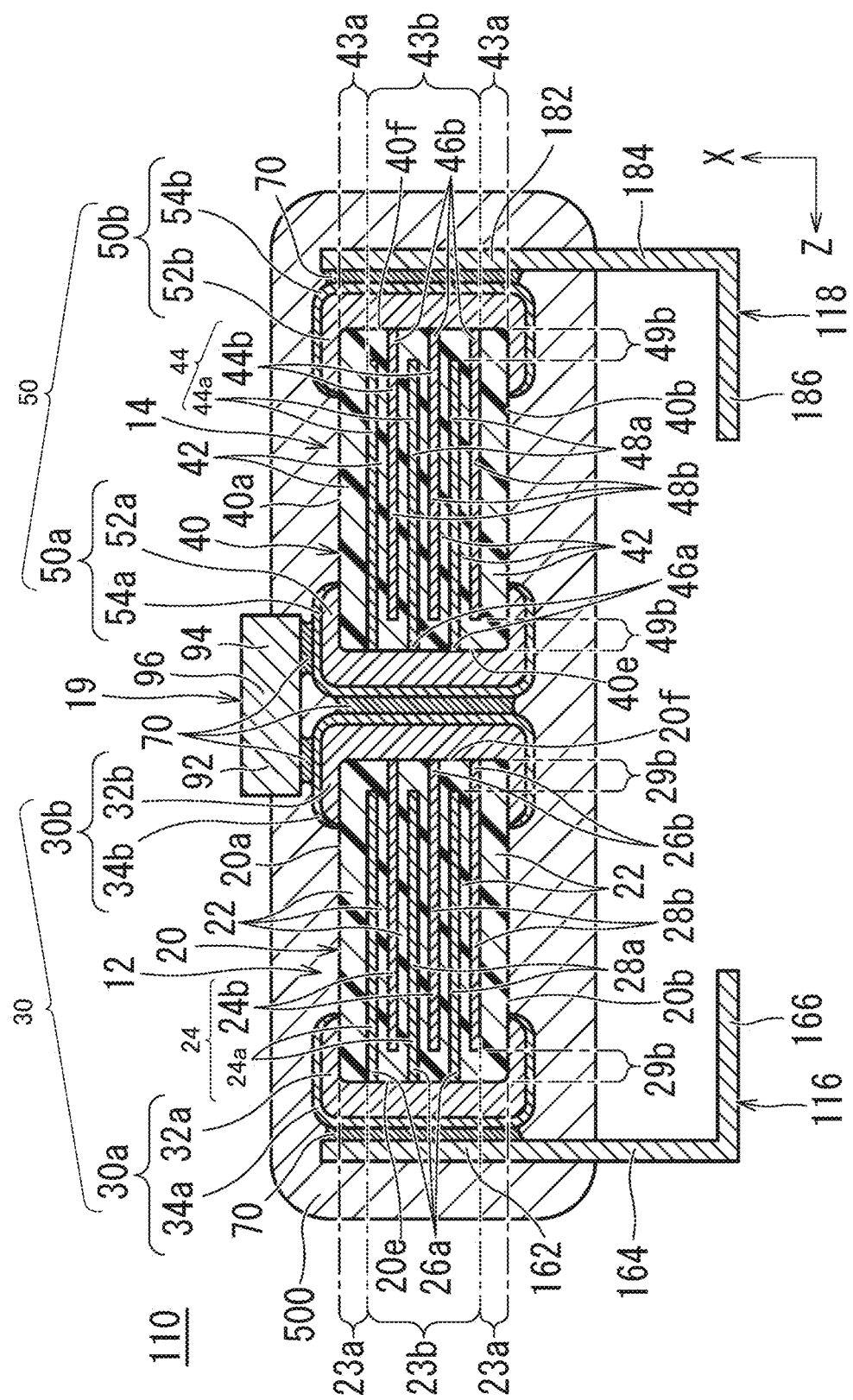
FIG. 7 is a cross-sectional view taken along a line VII-VII in FIG. 6.

Furthermore, another examples of first metal terminal 16 and second metal terminal 18 shown in FIG. 1 may be a first metal terminal 116 and a second metal terminal 118, respectively, shown in FIG. 6. FIG. 6 is an external perspective view showing an example of the multilayer ceramic electronic component including a modification of the metal terminal shown in FIG. 1. FIG. 7 is a cross-sectional view taken along a line VII-VII in FIG. 6.

A multilayer ceramic electronic component 110 shown in FIGS. 6 and 7 is different only in first metal terminal 116 and second metal terminal 118 but is the same or substantially the same as multilayer ceramic electronic component body 12 and multilayer ceramic electronic component body 14, as compared with multilayer ceramic electronic component 10 shown in FIGS. 1 to 4. Thus, the same or substantially the same portions as those in multilayer ceramic electronic component 10 shown in FIGS. 1 to 4 will be denoted by the same reference characters and the description thereof will not be repeated.

As shown in FIGS. 6 and 7, multilayer ceramic electronic component 110 includes first multilayer ceramic electronic component body 12, second multilayer ceramic electronic component body 14, first metal terminal 116, second metal terminal 118, and third metal terminal 19.

The dimension of multilayer ceramic electronic component 110 in a length direction Z is defined as an L dimension. The L dimension is preferably about 1.0 mm or more and about 100.0 mm or less, for example, without particular limitation. The dimension of multilayer ceramic electronic component 110 in a height direction X is defined as a T dimension. The T dimension is preferably about 0.5 mm or more and about 20.0 mm or less, for example, without particular limitation. The dimension of multilayer ceramic electronic component 110 in a width direction Y is defined as a W dimension. The W dimension is preferably about 0.5 mm or more and about 50.0 mm or less, for example, without particular limitation.

First metal terminal 116 includes a first joining portion 162 connected to first outer electrode 30a a first extension portion 164 connected to first joining portion 162 and extending from first joining portion 162 so as to provide a gap between multilayer ceramic electronic component body 12 and the mounting surface, and a first mounting portion 166 connected to first extension portion 164 and extending from first extension portion 164 in parallel or substantially in parallel with the mounting surface. By the metal terminals interposed in this way, thermal shock can be less likely to be applied to multilayer ceramic electronic component body 12. Furthermore, even stress caused by a temperature change or deformation of the mounting substrate can also be advantageously absorbed by elastic deformation of the metal terminals.

First metal terminal 116 has an L-shaped cross section. First metal terminal 116 having an L-shaped cross section in this way can improve the resistance to bending of the mounting substrate when multilayer ceramic electronic component 110 is mounted on the mounting substrate.

Second metal terminal 118 includes a second joining portion 182 connected to fourth outer electrode 50b, a third extension portion 184 connected to second joining portion 182 and extending from second joining portion 182 to provide a gap between multilayer ceramic electronic component body 14 and the mounting surface. and a second mounting portion 186 connected to third extension portion 184 and extending from third extension portion 184 in parallel with the mounting surface. By the metal terminals interposed in this way, thermal shock can be less likely to be applied to multilayer ceramic electronic component body 14. Furthermore, even stress caused by a temperature change or deformation of the mounting substrate can also be advantageously absorbed by elastic deformation of the metal terminals.

Second metal terminal 118 has an L-shaped cross section. Second metal terminal 118 having an L-shaped cross section in this way can improve the resistance to bending of the mounting substrate when multilayer ceramic electronic component 110 is mounted on the mounting substrate.

First joining portion 162 of first metal terminal 116 is connected to first outer electrode 30a provided on first end surface 20e of first multilayer body 20 to face first end surface 20e of first multilayer body 20. It is preferable that first joining portion 162, for example, has a rectangular or substantially rectangular plate shape having the same or substantially the same width as that of first outer electrode 30a on first end surface 20e of first multilayer body 20 and including one surface connected to first outer electrode 30a by joining material 70. Furthermore, first joining portion 162 may have any shape not limited to a rectangular or substantially rectangular shape, and may include a notch or a hole. It should be noted that the number of notches or holes may be one or may be more than one.

Second joining portion 182 of second metal terminal 118 is connected to fourth outer electrode 50b provided on fourth end surface 40f of second multilayer body 40 to face fourth end surface 40f of second multilayer body 40. It is preferable that second joining portion 182, for example, has a rectangular or substantially rectangular plate shape having the same or substantially the same width as that of fourth outer electrode 50b on fourth end surface 40f of second multilayer body 40 and including one surface connected to fourth outer electrode 50b by joining material 70. Furthermore, second joining portion 182 may have any shape not limited to a rectangular or substantially rectangular shape, and may include a notch or a hole. It should be noted that the number of notches or holes may be one or may be more than one.

First joining portion 162 of first metal terminal 116 is connected to first outer electrode 30a by joining material 70. Second joining portion 182 of second metal terminal 118 is connected to fourth outer electrode 50b by joining material 70.

Joining material 70 used to join first outer electrode 30a to first joining portion 162, or to join fourth outer electrode 50b to second joining portion 182 may preferably be made using solder, an electrically conductive adhesive, and a transient liquid-phase sintering (TLP) material, for example. When solder is used as a joining material, LF solder such as Sn—Sb based solder, Sn—Ag—Cu based solder, Sn—Cu based solder, and Sn—Bi based solder may preferably be used. In particular, in the case where Sn—Sb based solder is used, the content of Sb is preferably about 5% or more and about 15% or less, for example.

First extension portion 164 of first metal terminal 116 is connected to first joining portion 162 and extends in the direction of the mounting surface so as to provide a gap between the mounting surface and second main surface 20b of first multilayer body 20 that is to face the mounting surface. Thus, the distance from the mounting substrate can be increased, so that the stress from the mounting substrate can be relieved.

For example, first extension portion 164 has a rectangular or substantially rectangular plate shape, extends from first joining portion 162 in height direction X orthogonal or substantially orthogonal to both the main surfaces in the direction of the mounting surface, and is flush with first joining portion 162. Furthermore, the length of first extension portion 164 in the width direction (the length in the direction that connects first side surface 20c and second side surface 20d) is preferably the same or substantially the same as the length of first joining portion 162 in the width direction, but may be shorter or longer than the length of first joining portion 162 in the width direction, or may be shortened in a tapered shape.

Furthermore, the length of first extension portion 164 in height direction X is not particularly limited, but may be set to provide a space between the mounting surface and each of first multilayer ceramic electronic component body 12 and second multilayer ceramic electronic component body 14 that are covered by outer casing 500 (described later) (between the mounting surface and the surface of outer casing 500 that faces the mounting surface).

First extension portion 164 of first metal terminal 116 includes a surface that is partially processed in a recessed shape. Through this processed portion, the base material of first metal terminal 116 may be exposed. Thus, even if joining material 70 in first joining portion 162 of first metal terminal 116 is melted, the base material of first metal terminal 116 is exposed through the processed portion having a recessed shape to thus reduce the wettability of solder, and thus, flowing out of this solder can be prevented, with the result that flowing out of the melted solder to the outside of outer casing 500 can be reduced or prevented.

Furthermore, first extension portion 164 of first metal terminal 116 may be provided with a notch portion. Thus, the material amount of first metal terminal 116 can be reduced, so that the cost reduction effect can be achieved. Furthermore, the advantageous effect of relieving the stress from the substrate after mounting of the substrate can be achieved.

Third extension portion 184 of second metal terminal 118 is connected to second joining portion 182, and extends in the direction of the mounting surface so as to provide a gap between the mounting surface and fourth main surface 40b of second multilayer body 40 that is to face the mounting surface. Thus, the distance from the mounting substrate can be increased, so that the stress from the mounting substrate can be relieved.

For example, third extension portion 184 has a rectangular or rectangular plate shape, extends from second joining portion 182 in height direction X orthogonal or substantially orthogonal to both the main surfaces in the direction of the mounting surface, and is flush with second joining portion 182. Furthermore, the length of third extension portion 184 in the width direction (the length in the direction that connects third side surface 40c and fourth side surface 40d) is preferably the same or substantially the same as the length of second joining portion 182 in the width direction, but may be shorter or longer than the length of second joining portion 182 in the width direction, or may be shortened in a tapered shape.

Furthermore, the length of third extension portion 184 in height direction X is not particularly limited, but may be set to provide a space between the mounting surface and each of first multilayer ceramic electronic component body 12 and second multilayer ceramic electronic component body 14 that are covered by outer casing 500 (described later) (between the mounting surface and the surface of outer casing 500 that faces the mounting surface).

Third extension portion 184 of second metal terminal 118 includes a surface that is partially processed in a recessed shape. Through this processed portion, the base material of second metal terminal 118 may be exposed. Thus, even if joining material 70 in second joining portion 182 of second metal terminal 118 is melted, the base material of second metal terminal 118 is exposed through the processed portion having a recessed shape to thus reduce the wettability of solder, and thus, flowing out of this solder can be prevented, with the result that flowing out of the melted solder to the outside of outer casing 500 can be reduced or prevented.

Furthermore, third extension portion 184 of second metal terminal 118 may be provided with a notch portion. Thus, the material amount of second metal terminal 118 can be reduced, so that the cost reduction effect can be achieved. Furthermore, the effect of relieving the stress from the substrate after mounting of the substrate can be achieved.

First mounting portion 166 of first metal terminal 116 is connected to first extension portion 164 and extends from first extension portion 164 in the direction that connects first end surface 20e and second end surface 20f of first multilayer body 20. This first mounting portion 166 allows mounting on the mounting substrate.

First mounting portion 166 of first metal terminal 116 is bent to extend from the end portion of first extension portion 164 in the length direction that connects first end surface 20e and second end surface 20f of first multilayer body 20. Also, first mounting portion 166 may be bent in the direction opposite to first multilayer body 20 and second multilayer body 40.

The length of first mounting portion 166 of first metal terminal 116 in the direction that connects first end surface 20e and second end surface 20f of first multilayer body 20 is not particularly limited, but may be longer than the length of first outer electrode 30a in the length direction that is provided on second main surface 20b (the side close to the mounting surface) of first multilayer body 20.

Second mounting portion 186 of second metal terminal 118 is connected to third extension portion 184, and extends from third extension portion 184 in the direction that connects third end surface 40e and fourth end surface 40f of second multilayer body 40. This second mounting portion 186 enables mounting on the mounting substrate.

Second mounting portion 186 of second metal terminal 118 is bent to extend from the end portion of third extension portion 184 in the length direction that connects third end surface 40e and fourth end surface 40f of second multilayer body 40. Also, second mounting portion 186 may be bent in the direction opposite to first multilayer body 20 and second multilayer body 40.

The length of second mounting portion 186 of second metal terminal 118 in the direction that connects third end surface 40e and fourth end surface 40f of second multilayer body 40 is not particularly limited, but may be longer than the length of fourth outer electrode 50b in the length direction that is formed on fourth main surface 40b (on the side close to the mounting surface) of second multilayer body 40.

Figure 8:
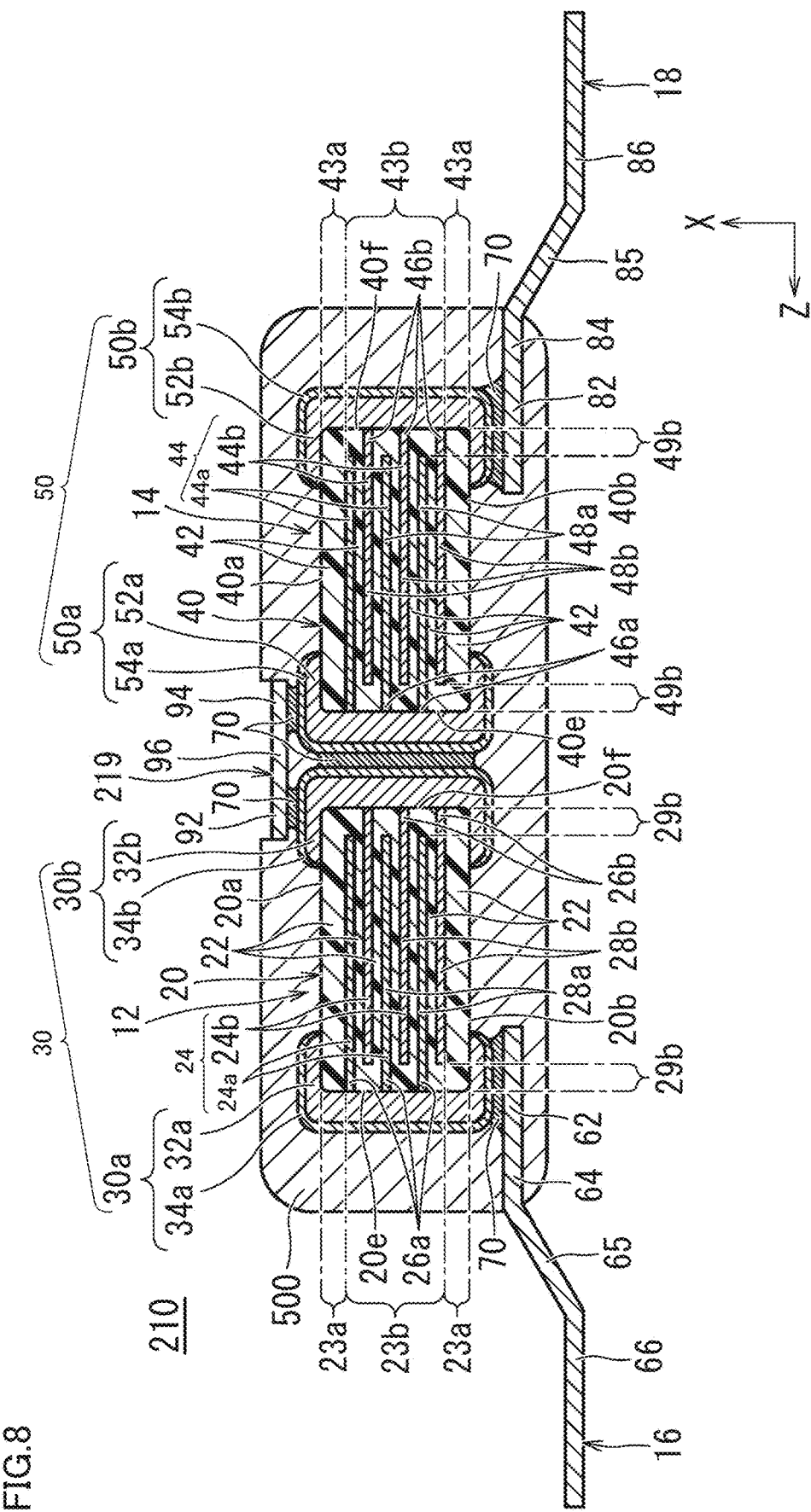
FIG. 8 is an external perspective view showing an example of the multilayer ceramic electronic component including a modification of the metal terminals shown in FIG. 1.

Another example of third metal terminal 19 shown in FIG. 1 may be a third metal terminal 219 shown in FIG. 8. FIG. 8 is a cross-sectional view showing an example of the multilayer ceramic electronic component including a modification of the metal terminal shown in FIG. 1.

A multilayer ceramic electronic component 210 shown in FIG. 8 is different only in third metal terminal 219 but the same or substantially the same in multilayer ceramic electronic component body 12 and multilayer ceramic electronic component body 14, as compared with multilayer ceramic electronic component 10 shown in FIGS. 1 to 4. Thus, the same or substantially the same portions as those in multilayer ceramic electronic component 10 shown in FIGS. 1 to 4 will be denoted by the same reference characters and the description thereof will not be repeated.

As shown in FIG. 8, multilayer ceramic electronic component 210 includes first multilayer ceramic electronic component body 12, second multilayer ceramic electronic component body 14, first metal terminal 16, second metal terminal 18, and third metal terminal 219.

The dimension of multilayer ceramic electronic component 210 in a length direction Z is defined as an L dimension. The L dimension is preferably about 1.0 mm or more and about 100.0 mm or less, for example, without particular limitation. The dimension of multilayer ceramic electronic component 110 in a height direction X is defined as a T dimension. The T dimension is preferably about 0.5 mm or more and about 20.0 mm or less, for example, without particular limitation. The dimension of multilayer ceramic electronic component 110 in a width direction Y is defined as a W dimension. The W dimension is preferably about 0.5 mm or more and about 50.0 mm or less, for example, without particular limitation.

Third metal terminal 219 is provided on the surface of outer casing 500 so as not to protrude from the surface. Thus, third metal terminal 219 may flush with the surface of outer casing 500, or may be recessed from the surface of outer casing 500. Thus, multilayer ceramic electronic component 10 can be reduced in height dimension. Also, third metal terminal 219 may have a flat shape or may be provided with a protrusion so as not to protrude from the surface of outer casing 500.

First metal terminals 16, 116, second metal terminals 18, 118, and third metal terminals 19, 219 each include a terminal body as a base material and a plating film provided on the surface of the terminal body.

It is preferable that the terminal body is made of Ni, Fe, Cu, Ag, Cr, or an alloy that contains one or more of these metals as a main component, for example. It is further preferable that the terminal body is made of Ni, Fe, Cr, or an alloy that contains one or more of these metals as a main component, for example. Specifically, the base material of the terminal body may preferably be made using an Fe-42Ni alloy or an Fe-18 Cr alloy, for example. It is preferable that first metal terminals 16, 116, second metal terminals 18, 118, and third metal terminals 19, 219 each have a thickness of about 0.05 mm or more and about 0.5 mm or less, for example.

The plating film includes a lower plating film and an upper plating film, for example.

The lower plating film is provided on the surface of the terminal body while the upper plating film is provided on the surface of the lower plating film. Each of the lower plating film and the upper plating film may include a plurality of plating layers.

It should be noted that a plating film does not have to be provided at least on the circumferential surfaces of first extension portion 62, second extension portion 65, and first mounting portion 66 of first metal terminal 16, and on the circumferential surfaces of third extension portion 84, fourth extension portion 85, and second mounting portion 86 of second metal terminal 18.

Furthermore, a plating film does not have to be provided at least on the circumferential surfaces of first extension portion 164 and first mounting portion 166 of first metal terminal 116, and on the circumferential surfaces of second extension portion 184 and second mounting portion 186 of second metal terminal 118.

Thus, when solder is used to mount multilayer ceramic electronic components 10, 110, 210 on the mounting substrate, wetting of first metal terminals 16, 116 and second metal terminals 18, 118 by solder can be reduced or prevented. This can reduce or prevent wetting by solder particularly between multilayer ceramic electronic component body 12 and each of first metal terminals 16, 116 (a float portion) and between multilayer ceramic electronic component body 14 and each of second metal terminals 18, 118 (a float portion). Thus, the float portion can be prevented from being filled with solder. Accordingly, the space of the float portion can be sufficiently ensured. Therefore, first extension portions 64, 164 of first metal terminals 16, 116 and second extension portions 84, 184 of second metal terminals 18, 118 are more likely to elastically deform, thus enabling further absorption of mechanical distortion that occurs in a ceramic layer due to application of an AC voltage. Thus, transmission of vibration occurring at this time through first outer electrode 30a and fourth outer electrode 50b to the mounting substrate can be reduced or prevented. Thus, first metal terminals 16, 116 and second metal terminals 18, 118 are provided to enable more stable reduction or prevention of acoustic noise (squealing). In addition, no plating film needs to be provided on the entire or substantially the entire circumferential surfaces of first metal terminals 16, 116 and second metal terminals 18, 118.

When the plating films on the circumferential surfaces of first extension portion 64 of first metal terminal 16 and third extension portion 84 of second metal terminal 18 are removed, when the plating films on the circumferential surfaces of first extension portion 164 and first mounting portion 166 of first metal terminal 116, and on the circumferential surfaces of second extension portion 184 and second mounting portion 186 of second metal terminal 118 are removed, or when the plating films on the entire circumferential surfaces of first metal terminals 16, 116 and second metal terminals 18, 118 are removed, the following examples of methods are conceivable, including a removing (cutting, polishing) method by a machine, a removing method by laser trimming, a removing method by a plating peeling agent (for example, sodium hydroxide), or a resist-film removing method by steps of, before formation of plating films on first metal terminals 16, 116 and second metal terminals 18, 118, forming resist films to cover portions of first metal terminals 16, 116 and second metal terminals 18, 118 that are not plated, and then, forming plating films on first metal terminals 16, 116 and second metal terminals 18, 118, thus, removing the resist films.

It is preferable that the lower plating film is made of, for example, Ni, Fe, Cu, Ag, Cr, or an alloy containing one or more of these metals as a main component. It is further preferable that the lower plating film is made of, for example, Ni, Fe, Cr, or an alloy that contains one or more of these metals as a main component. It is preferable that the lower plating film has a thickness of about 0.2 μm or more and about 5.0 μm or less, for example.

It is preferable that the upper plating film is made of, for example, Sn, Ag, Au, or an alloy that contains one or more of these metals as a main component. It is further preferable that the upper plating film is made of, for example, Sn or an alloy containing Sn as a main component. The upper plating film is made of Sn or an alloy containing Sn as a main component, thus enabling improvement in solderability between outer electrode 30 and each of first metal terminals 16, 116, and between outer electrode 50 and each of second metal terminals 18, 118. It is preferable that the thickness of the upper plating film is about 1.0 μm or more and about 5.0 μm or less, for example.

Furthermore, each of the terminal body and the lower plating film is preferably made of Ni, Fe, or Cr having a high melting point or an alloy containing one or more of these metals as a main component, thus enabling improvement in heat resistance of each outer electrode.

(D) Outer Casing

Outer casing 500 covers first multilayer ceramic electronic component body 12, second multilayer ceramic electronic component body 14, at least a portion of each of first metal terminals 16, 116, at least a portion of each of second metal terminals 18, 118, and at least a portion of each of third metal terminals 19, 219. In other words, first metal terminals 16, 116, second metal terminals 18, 118, and third metal terminals 19, 219 are provided to be exposed from outer casing 500.

Outer casing 500 is preferably made of a silicone-based material or an epoxy-based material, for example. Thus, resins come in close contact with first multilayer ceramic electronic component body 12 and second multilayer ceramic electronic component body 14, and thus, the insulating property can be ensured between the terminals inside outer casing 500.

Each of multilayer ceramic electronic components 10, 110, 210 configured as described above is provided with third metal terminal 19 that is exposed from outer casing 500. Thus, even when multilayer ceramic electronic component bodies 12 and 14 connected in series are covered by outer casing 500, third metal terminal 19 is used to enable accurate measurement of the insulation resistance values (IR values) of multilayer ceramic electronic component bodies 12 and 14.

In other words, when the insulation resistance value (IR value) of first multilayer ceramic electronic component body 12 is measured, measurement terminals are connected to first metal terminal 16 and third metal terminal 19 to measure the insulation resistance value (the IR value) of first multilayer ceramic electronic component body 12. When the insulation resistance value (IR value) of second multilayer ceramic electronic component body 14 is measured, measurement terminals are connected to second metal terminal 18 and third metal terminal 19 to measure the insulation resistance value (IR value) of second multilayer ceramic electronic component body 14.

Thus, in the case where first and second multilayer ceramic electronic component bodies 12 and 14 connected in series and covered by the outer casing include a multilayer ceramic electronic component body having an insulation resistance value (IR value) less than the lower limit of the standard IR value, any of multilayer ceramic electronic components 10, 110 and 210 that includes such a multilayer ceramic electronic component body can be reliably removed by characteristics selection.

In addition, in the case where any of multilayer ceramic electronic component bodies 12 and 14 connected in series and covered by outer casing 500 includes a multilayer ceramic electronic component body having an insulation resistance value (IR value) less than the lower limit of the standard IR value, the lifetime of such a multilayer ceramic electronic component is reduced.

Therefore, according to multilayer ceramic electronic components 10, 110 and 210, even in the case where the product quality is excellent in terms of the total sum of the insulation resistance values (IR values) of first and second multilayer ceramic electronic component bodies 12 and 14 connected in series and covered by outer casing 500, any of multilayer ceramic electronic components 10, 110 and 210 that includes a multilayer ceramic electronic component body having an insulation resistance value (IR value) less than the lower limit of the standard IR value can be selected as a defective product. Therefore, multilayer ceramic electronic components 10, 110 and 210 of high quality can be provided, each of which includes multilayer ceramic electronic component bodies each having an insulation resistance value (IR value) reliably exceeding the standard IR value.

2. METHOD OF MANUFACTURING MULTILAYER CERAMIC ELECTRONIC COMPONENT

The following is an explanation of a preferred embodiment of an example method of manufacturing the multilayer ceramic electronic component according to the present invention configured as described above.

(A) Manufacturing of Multilayer Ceramic Electronic Component Body

An example method of manufacturing a first multilayer ceramic electronic component body and a second multilayer ceramic electronic component body will be described.

First, a conductive paste for inner electrodes and for forming a dielectric green sheet and an inner electrode layer is prepared. The dielectric green sheet and the conductive paste for inner electrodes each include a binder and a solvent, which may be a known organic binder and a known organic solvent.

Then, a conductive paste for inner electrodes is printed in a prescribed pattern on the dielectric green sheet, for example, by a screen printing method or a gravure printing method, to form an inner electrode pattern.

Then, a prescribed number of dielectric green sheets used for outer layers and each including no inner electrode pattern printed thereon are stacked, on which dielectric green sheets each including an inner electrode pattern printed thereon are sequentially stacked, on which a prescribed number of dielectric green sheets for outer layers are stacked, to produce a multilayer body sheet.

Then, this multilayer body sheet is pressed in the stacking direction by, for example, hydrostatic pressure pressing or the like to produce a multilayer body block.

Then, the multilayer body block is cut into a prescribed shape and dimension so as to cut out a raw multilayer body chip. On this occasion, barrel polishing or the like, for example, may be performed on the raw multilayer body chip such that corner portions and ridgeline portions are rounded. Then, the obtained raw multilayer body chip is calcined to produce a multilayer body. The temperature for calcining the raw multilayer body chip depends on the materials of the dielectric and the conductive paste for inner electrodes, but is preferably about 900° C. or more and about 1400° C. or less, for example.

The following is an explanation of a method of forming an underlying electrode layer in the case where the underlying electrode layer of the outer electrode is a baked layer.

In order to form a baked layer of the outer electrode, a conductive paste used for outer electrodes and including a glass component and metal is applied by a method such as dipping on the exposed portion of the first extending electrode portion of the first inner electrode layer that is exposed from the first end surface on the surface of the multilayer body, and the exposed portion having the conductive paste applied thereon is baked, to form a first underlying electrode layer. Similarly, in order to form a baked layer of the outer electrode, for example, a conductive paste used for outer electrodes and including a glass component and metal is applied by a method such as dipping, for example, on the exposed portion of the second extending electrode portion of the second inner electrode layer that is exposed from the second end surface of the multilayer body, and the exposed portion having the conductive paste applied thereon is baked, to form a second underlying electrode layer. The temperature of the baking process in this case is preferably 700° C. or more and 900° C. or less, for example.

The following is an explanation of a method of forming an underlying electrode layer in the case where the underlying electrode layer is formed of a conductive resin layer.

It should be noted that a conductive resin layer may be formed on the surface of the baked layer or a conductive resin layer may be solely formed directly on the surface of the multilayer body without forming a baked layer.

In order to form a conductive resin layer, a conductive resin paste containing a thermosetting resin and a metal component is applied onto the surface of the baked layer or the multilayer body, which is then heat-treated at a temperature of 250 □C or more and 550 □C or less to thermally cure the resin, thereby forming a conductive resin layer. An atmosphere during the heat treatment in this case is preferably a $N_2$ atmosphere. Moreover, in order to prevent scattering of the resin and prevent oxidation of various metal components, an oxygen concentration is preferably suppressed to be 100 ppm or less.

The following is an explanation of a method of forming an underlying electrode layer in the case where the underlying electrode layer is formed of a thin film layer.

When the underlying electrode layer is formed of a thin film layer, the underlying electrode layer can be formed by a thin film forming method such as a sputtering method or a vapor deposition method, for example. The underlying electrode layer formed of a thin film layer is preferably, for example, a layer of about 1 µm or less formed by deposition of metal particles.

Furthermore, a plating layer may be provided on the exposed portion of the inner electrode layer of the multilayer body without providing an underlying electrode layer.

The first end surface and the second end surface of the multilayer body are subjected to a plating process to form an underlying plating electrode on the exposed portion of the inner electrode layer. For the plating process, for example, either of electrolysis plating and non-electrolytic plating may be employed. However, non-electrolytic plating requires a pre-process using a catalyst or the like in order to improve a plating deposition rate, which may disadvantageously complicate the steps. Therefore, it is normally preferable to employ electrolysis plating. As the plating method, it is preferable to use barrel plating. Moreover, an upper plating electrode may be formed on the surface of the lower plating electrode in a similar manner, as required.

Then, a plating layer is formed on each of the surface of the underlying electrode layer, the surface of the conductive resin layer or the surface of the underlying plating layer, and the surface of the upper plating layer, to form an outer electrode.

For each multilayer ceramic electronic component body, an Ni plating layer and an Sn plating layer are formed as plating layers on the baked layer. The Ni plating layer and the Sn plating layer are formed sequentially by the barrel plating method, for example.

In this way, each multilayer ceramic electronic component body is produced.

(B) Joining Between First and Second Multilayer Ceramic Electronic Component Bodies The following is an explanation of a method of joining the first multilayer ceramic electronic component body and the second multilayer ceramic electronic component body.

First, a plurality of first multilayer ceramic electronic component bodies 12 or a plurality of second multilayer ceramic electronic component bodies 14 are prepared, in each of which joining material 70 is applied onto one of second end surface 20f of first multilayer ceramic electronic component body and third end surface 40e of second multilayer ceramic electronic component body 14. In this case, solder is used as joining material 70.

Then, the first multilayer ceramic electronic component body and the second multilayer ceramic electronic component body are aligned such that the end surface of one of the multilayer ceramic electronic component bodies that has an alumina substrate onto which joining material 70 is applied faces and contacts the end surface of the other of the multilayer ceramic electronic component bodies.

Then, the multilayer ceramic electronic component bodies in the above-described state are subjected to a reflow to melt the solder provided as joining material 70, and thus, join first multilayer ceramic electronic component body 12 and second multilayer ceramic electronic component body 14 to each other.

(C) Method of Attaching Metal Terminals

The following is an explanation of the step of attaching metal terminals in the method of manufacturing a multilayer ceramic electronic component.

A first metal terminal, a second metal terminal, and a third metal terminal are prepared.

Then, a joining material is applied onto the outer electrode on the first end surface side of the first multilayer ceramic electronic component body prepared as described above (the end surface on the side where the first multilayer ceramic electronic component body and the second multilayer ceramic electronic component body do not face each other) and applied onto the outer electrode on the second end surface side of the second multilayer ceramic electronic component body prepared as described above (the end surface on the side where the first multilayer ceramic electronic component body and the second multilayer ceramic electronic component body do not face each other), and then, subjected to a reflow, thus attaching the metal terminals. Solder, for example, can be used as a joining material.

(D) Method of Forming Outer Casing

A method of forming an outer casing will be described below.

First, an outer casing is used for molding so as to cover the first multilayer ceramic electronic component body, the second multilayer ceramic electronic component body, at least a portion of the first metal terminal, at least a portion of the second metal terminal, and at least a portion of the third metal terminal. For example, by a transfer molding method, a resin is introduced into a mold and hardened for resin molding so as to cover the first multilayer ceramic electronic component body, the second multilayer ceramic electronic component body, at least a portion of the first metal terminal, at least a portion of the second metal terminal, and at least a portion of the third metal terminal.

Then, an unnecessary portion in a pair of metal terminals is cut. For example, an unnecessary portion in the pair of metal terminals is cut using a stamping die.

Then, the pair of metal terminals are bent in a desired shape. For example, the pair of metal terminals are bent in a desired shape, for example, using a bending die.

A multilayer ceramic electronic component is manufactured by the method as describe above.

3. EXPERIMENTAL EXAMPLE

According to the above-described manufacturing method, a multilayer ceramic electronic component was produced, and the IR values of the first and second multilayer ceramic electronic component bodies that define a multilayer ceramic electronic component were measured to perform quality evaluations. Multilayer ceramic capacitors were used for the first and second multilayer ceramic electronic component bodies.

First, a plurality of chips to be used as the first and second multilayer ceramic electronic component bodies each designed solely for a chip described below were produced. Then, chips 1 to 5 were produced so as to have respective IR values as shown in Table 1. The specifications of the respective multilayer ceramic electronic component bodies are as follows.

(A) Specifications of First and Second Multilayer Ceramic Electronic Component Bodies (Capacitors) (Chips)

Size of each multilayer ceramic electronic component body: L×W×T (design value): about 6.1 mm×about 5.0 mm×about 2.6 mm Ceramic material: $BaTiO_3$ Capacitance: about 22 μF Rated voltage: about 25V Material of inner electrode layer: Ni Structure of Outer Electrode Underlying electrode layer Electrode containing Cu and glass Plating layer: two-layer structure of Ni plating layer (thickness: about 2 μm)+Sn plating layer (thickness: about 4 μm)

TABLE 1

| Multilayer Ceramic Electronic Component Body | Insulation Resistance Value (IR) (Ω) | Determination |
| --- | --- | --- |
| Chip 1 | $2.0 \times 10^6$ | NG (equal to or less than lower limit) |
| Chip 2 | $3.0 \times 10^6$ | at and around lower limit |
| Chip 3 | $5.0 \times 10^5$ | at and around center of standard value |
| Chip 4 | $7.0 \times 10^6$ | at and around center of standard value |
| Chip 5 | $8.0 \times 10^6$ | NG (equal to or greater than upper limit) |

Then, multilayer ceramic electronic components to be used as samples in the experiment were produced to be designed as described below in combination of chips 1 to 5 as shown in Table 2. The multilayer ceramic electronic components each were produced to have the same structure as that of the multilayer ceramic electronic component shown in FIG. 1.

(B) Specifications of Multilayer Ceramic Electronic Component

Size of multilayer ceramic electronic component: L×W×T (entire component including metal terminals): about 16.0 mm×about 6.0 mm×about 4.0 mm Capacitance: about 44 μF Rated voltage: about 50V Creepage distance: about 13 mm Number of multilayer ceramic electronic component bodies (capacitors): series connection of two multilayer ceramic electronic component bodies Metal terminal: terminal body: SUS430+plating film: two-layer structure of Ni plating layer+Sn plating layer 0 Outer casing: epoxy resin

TABLE 2

| Sample Number | Combination |
| --- | --- |
| 1 | Chip 3 and Chip 3 |
| 2 | Chip 1 and Chip 5 |
| 3 | Chip 2 and Chip 4 |

(C) Method of Measuring IR Values of Multilayer Ceramic Electronic Components

Then, the insulation resistance values (IR values) of the multilayer ceramic electronic components of sample numbers 1 to 3 prepared as described above were measured.

The method of measuring the IR values will be described below. Specifically, when the insulation resistance value (IR value) of the first multilayer ceramic electronic component body (A) (hereinafter referred to as a chip A) was measured, measurement terminals were connected to the first metal terminal and the third metal terminal to measure the value of the insulation resistance value (IR value) of the first multilayer ceramic electronic component body. Also, when the insulation resistance value (IR value) of the second multilayer ceramic electronic component body (B) (hereinafter referred to as a chip B) was measured, measurement terminals were connected to the second metal terminal and the third metal terminal to measure the value of the insulation resistance value (IR value) of the second multilayer ceramic electronic component body.

When the resistance ratio (insulation resistance value of A/insulation resistance value of B) is about 0.8 or more and about 1.2 or less, the evaluation criterion is defined as "A".

When the resistance ratio (insulation resistance value of A/insulation resistance value of B) is 0.4 or more and less than about 0.8 and is about 1.2 or more and less than about 2.3, the evaluation criterion is defined as "B".

When the resistance ratio (insulation resistance value of A/insulation resistance value of B) is less than about 0.4 and about 2.3 or more, the evaluation criterion is defined as "C". Table 3 shows the result of measuring the insulation resistance values and the results of determining and evaluating the measurement results.

TABLE 3

| Sample Number | Insulation Resistance Value (IR) ($\Omega$) of Chip A | Insulation Resistance Value (IR) ($\Omega$) of Chip B | Insulation Resistance Value (IR) ($\Omega$) across Multilayer Ceramic Electronic Component | Determination about Chip A | Determination about Chip B | Comprehensive Determination | Resistance Ratio | Quality Evaluation |
|---|---|---|---|---|---|---|---|---|
| 1 | $5.0 \times 10^6$ | $5.0 \times 10^6$ | $10.0 \times 10^6$ | G | G | G | 1 | A |
| 2 | $2.0 \times 10^6$ | $8.0 \times 10^6$ | $10.0 \times 10^6$ | NG | G | NG | 0.25 | C |
| 3 | $3.0 \times 10^6$ | $7.0 \times 10^6$ | $10.0 \times 10^6$ | G | G | G | 0.43 | B |

As other measurement conditions, the insulation resistance values at current values at about 50V and about 60s were calculated.

(D) Method of Determining Multilayer Ceramic Electronic Component (i) Method of Determining Each Multilayer Ceramic Electronic Component Body For each of chips A and B in each of the multilayer ceramic electronic components as samples of sample numbers 1 to 3, the insulation resistance value (IR value) at a current value at about 50V and about 60s was calculated.

Then, the insulation resistance value ranging of about $2.5 \times 10^6 \Omega$ or more and about $10.0 \times 10^6 \Omega$ or less was determined as G (good) and the insulation resistance value less than about $2.5 \times 10^6 \Omega$ was determined as NG (defective).

(ii) Method for Comprehensive Determination about Multilayer Ceramic Electronic Component By the method of determining the multilayer ceramic electronic components of samples of sample numbers 1 to 3, any multilayer ceramic electronic component including one of the multilayer ceramic electronic component bodies of chips A and B that was determined as NG (defective) was determined as NG (defective).

(iii) Evaluation Method and Evaluation Criterion for Quality of Multilayer Ceramic Electronic Component Quality was evaluated based on the resistance ratio between chip A and chip B (insulation resistance value of A/insulation resistance value of B).

This is due to the following reason. Specifically, since sharing of the voltage between the first multilayer ceramic electronic component body and the second multilayer ceramic electronic component body varies depending on the insulation resistance values (IR values) of the respective multilayer ceramic electronic component bodies, a higher voltage exceeding the ratings of the respective multilayer ceramic electronic component bodies is applied to the multilayer ceramic electronic component body having a relatively large insulation resistance value, thereby deteriorating the entire quality.

The specific evaluation criterion is as described below.

According to Table 3, the insulation resistance value (IR value) across the multilayer ceramic electronic component of each of sample numbers 1 to 3 was about $10.0 \times 10^6 \Omega$. In each of the multilayer ceramic electronic components according to preferred embodiments of the present invention, however, the insulation resistance values (IR values) of respective chips A and B can be separately measured and used to determine the evaluation of the multilayer ceramic electronic components. Specifically, the multilayer ceramic electronic component of sample number 2 included chip 1 determined as defective in chip A and also exhibited a resistance ratio value not satisfying the evaluation criterion. Thus, the quality of the multilayer ceramic electronic component was evaluated as "C".

Therefore, even in the case where any of the plurality of multilayer ceramic electronic component bodies (capacitors) connected in series and covered by the outer casing includes a multilayer ceramic electronic component body (a capacitor) having an IR value less than the lower limit of the standard IR value, such a multilayer ceramic electronic component body can be reliably removed by characteristics selection. Accordingly, in the multilayer ceramic electronic components according to preferred embodiments of the present invention, even in the case where the product quality is excellent in terms of the total sum of the insulation resistance values (IR values) of a plurality of multilayer ceramic electronic component bodies connected in series and covered by an outer casing, a multilayer ceramic electronic component including a multilayer ceramic electronic component body (a capacitor) having an IR value less than the lower limit of the standard IR value among the multilayer ceramic electronic component bodies (capacitors) can be selected as a defective product. Therefore, multilayer ceramic electronic components with excellent quality can be provided to each include multilayer ceramic electronic component bodies (capacitors) each having an insulation resistance value (IR value) that reliably exceeds the standard IR value.

Although the preferred embodiments of the present invention have been disclosed in the above description, the present invention is not limited thereto.

Various modifications can be made to the above-described preferred embodiments with regard to mechanisms, shapes, materials, quantities, positions, arrangements, or the like without departing from the scope of the technical idea and object of the present invention, and are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a first multilayer ceramic electronic component body including:
a first multilayer body including a plurality of stacked ceramic layers and a plurality of stacked inner electrode layers, the first multilayer body including a first main surface and a second main surface that face each other in a height direction, a first side surface and a second side surface that face each other in a width direction orthogonal or substantially orthogonal to the height direction, and a first end surface and a second end surface that face each other in a length direction orthogonal or substantially orthogonal to the height direction and the width direction;
a first outer electrode disposed on the first end surface of the first multilayer body; and
a second outer electrode disposed on the second end surface of the first multilayer body; and
a second multilayer ceramic electronic component body including:
a second multilayer body including a plurality of stacked ceramic layers and a plurality of stacked inner electrode layers, the second multilayer body including a first main surface and a second main surface that face each other in the height direction, a first side surface and a second side surface that face each other in the width direction orthogonal or substantially orthogonal to the height direction, and a first end surface and a second end surface that face each other in the length direction orthogonal or substantially orthogonal to the height direction and the width direction;
a third outer electrode disposed on the first end surface of the second multilayer body; and
a fourth outer electrode disposed on the second end surface of the second multilayer body; wherein
the first multilayer ceramic electronic component body and the second multilayer ceramic electronic component body face each other in the length direction that connects the first end surface and the second end surface;
a first metal terminal is connected to the first outer electrode;
a second metal terminal is connected to the fourth outer electrode;
an outer casing covers the first multilayer ceramic electronic component body, the second multilayer ceramic electronic component body, at least a portion of the first metal terminal, and at least a portion of the second metal terminal;
a third metal terminal is exposed from the outer casing, and in the height direction, the third metal terminal extending over and overlapping with the second outer electrode of the first multilayer ceramic electronic component body and the third outer electrode of the second multilayer ceramic electronic component body; and
at least a portion of the third metal terminal extends into the outer casing.

2. The multilayer ceramic electronic component according to claim 1, wherein
the first outer electrode is disposed on the second main surface located on a side of the first multilayer body that is adjacent to or in a vicinity of a mounting surface;
the first metal terminal is connected to the first outer electrode located on the second main surface of the first multilayer body;
the fourth outer electrode is disposed on the second main surface located on a side of the second multilayer body that is adjacent to or in a vicinity of the mounting surface; and
the second metal terminal is connected to the fourth outer electrode located on the second main surface of the second multilayer body.

3. The multilayer ceramic electronic component according to claim 1, wherein the first metal terminal includes:
a first joining portion connected to the first outer electrode and facing the second main surface;
a first extension portion connected to the first joining portion and extending to be spaced away from the first multilayer ceramic electronic component body and the second multilayer ceramic electronic component body in a direction that is in parallel or substantially in parallel with the second main surface;
a second extension portion connected to the first extension portion and extending on a side of a mounting surface to provide a gap between the second main surface and the mounting surface, and
a first mounting portion connected to the second extension portion and extending substantially in parallel with the mounting surface, the first mounting portion being to be mounted on a mounting substrate; and
the second metal terminal includes:
a second joining portion connected to the second outer electrode and facing the second main surface;
a third extension portion connected to the second joining portion and extending to be spaced away from the first multilayer ceramic electronic component body and the second multilayer ceramic electronic component body in a direction that is in parallel or substantially in parallel with the second main surface;
a fourth extension portion connected to the third extension portion and extending on a side of the mounting surface to provide a gap between the second main surface and the mounting surface; and
a second mounting portion connected to the fourth extension portion and extending in parallel or substantially in parallel with the mounting surface, the second mounting portion being to be mounted on the mounting substrate.

4. The multilayer ceramic electronic component according to claim 1, wherein the outer casing is made of a silicone-based material or an epoxy-based material.

5. The multilayer ceramic electronic component according to claim 1, wherein the first multilayer body includes rounded corner portions and ridgeline portions.

6. The multilayer ceramic electronic component according to claim 1, wherein the second multilayer body includes rounded corner portions and ridgeline portions.

7. The multilayer ceramic electronic component according to claim 1, wherein the first multilayer body includes two outer layer portions each including at least two of the plurality of ceramic layers, and an inner layer portion including on or more of the plurality of ceramic layers and the plurality of inner electrode layers respectively disposed thereon; and the inner layer portion is disposed between the two outer layer portions.

8. The multilayer ceramic electronic component according to claim 1, wherein the second multilayer body includes two outer layer portions each including at least two of the plurality of ceramic layers, and an inner layer portion including on or more of the plurality of ceramic layers and the plurality of inner electrode layers respectively disposed thereon; and the inner layer portion is disposed between the two outer layer portions.

9. The multilayer ceramic electronic component according to claim 1, wherein the first multilayer body defines and functions as a capacitor.

10. The multilayer ceramic electronic component according to claim 9, wherein the plurality of ceramic layers are made of at least one of $BaTiO_3$, $CaTiO_3$, $SrTiO_3$, or $CaZrO_3$.

11. The multilayer ceramic electronic component according to claim 9, wherein a thickness of each of the plurality of dielectric layers is about 0.5 μm or more and about 10 μm or less.

12. The multilayer ceramic electronic component according to claim 1, wherein the second multilayer body defines and functions as a capacitor.

13. The multilayer ceramic electronic component according to claim 12, wherein the plurality of ceramic layers are made of at least one of $BaTiO_3$, $CaTiO_3$, $SrTiO_3$, or $CaZrO_3$.

14. The multilayer ceramic electronic component according to claim 12, wherein a thickness of each of the plurality of dielectric layers is about 0.5 μm or more and about 10 μm or less.

15. The multilayer ceramic electronic component according to claim 1, wherein the plurality of inner electrode layers of the first multilayer body include a plurality of first inner electrode layers and a plurality of second inner electrode layers that are alternately arranged in the height direction;

each of the plurality of first inner electrode layers is connected to the first outer electrode; and each of the plurality of second inner electrode layers is connected to the second outer electrode.

16. The multilayer ceramic electronic component according to claim 15, wherein each of the plurality of first inner electrode layers and the plurality of second inner electrode layers includes at least one of Ni, Cu, Ag, Pd, Au, or an Ag—Pd alloy.

17. The multilayer ceramic electronic component according to claim 15, wherein each of the plurality of first inner electrode layers and the plurality of second inner electrode layers has a thickness of about 0.2 μm or more and about 3.0 μm or less.

18. The multilayer ceramic electronic component according to claim 1, wherein the plurality of inner electrode layers of the second multilayer body include a plurality of third inner electrode layer and a plurality of fourth inner electrode layers that are alternately arranged in the height direction;

each of the plurality of third inner electrode layers is connected to the third outer electrode; and each of the plurality of fourth inner electrode layers is connected to the fourth outer electrode.

19. The multilayer ceramic electronic component according to claim 18, wherein each of the plurality of third inner electrode layers and the plurality of fourth inner electrode layers includes at least one of Ni, Cu, Ag, Pd, Au, or an Ag—Pd alloy.

20. The multilayer ceramic electronic component according to claim 18, wherein each of the plurality of third inner electrode layers and the plurality of fourth inner electrode layers has a thickness of about 0.2 μm or more and about 3.0 μm or less.

* * * * *